(12) United States Patent
Ushirogouchi et al.

(10) Patent No.: US 7,579,390 B2
(45) Date of Patent: *Aug. 25, 2009

(54) INKJET INK COMPOSITION AND PRINTED MATTERS CREATED USING INKJET INK COMPOSITION

(75) Inventors: Toru Ushirogouchi, Yokohama (JP); Kazuhiko Ohtsu, Mishima (JP); Mitsuru Ishibashi, Yokohama (JP); Ryozo Akiyama, Mishima (JP); Masahi Hiroki, Yokohama (JP)

(73) Assignee: Toshiba Tec Kabushiki Kaisha (JP)

( * ) Notice: Subject to any disclaimer, the term of this patent is extended or adjusted under 35 U.S.C. 154(b) by 582 days.

This patent is subject to a terminal disclaimer.

(21) Appl. No.: 11/075,183

(22) Filed: Mar. 8, 2005

(65) Prior Publication Data
US 2006/0025497 A1 Feb. 2, 2006

(30) Foreign Application Priority Data
Jul. 29, 2004 (JP) ............................. 2004-222190

(51) Int. Cl.
| C09D 11/00 | (2006.01) |
| B41J 2/01 | (2006.01) |
| G01D 11/00 | (2006.01) |
| B05D 1/32 | (2006.01) |
| B05D 3/06 | (2006.01) |
| C08F 2/48 | (2006.01) |
| C08F 2/50 | (2006.01) |
| C08J 7/04 | (2006.01) |
| C08J 3/28 | (2006.01) |
| C08G 59/68 | (2006.01) |
| A61L 27/34 | (2006.01) |
| B29C 71/04 | (2006.01) |
| C08F 2/46 | (2006.01) |
| C08G 59/14 | (2006.01) |
| C08G 65/18 | (2006.01) |

(52) U.S. Cl. .................. 523/160; 427/466; 427/508; 427/511; 427/517; 427/558; 347/1; 347/100; 347/102; 522/6; 522/31; 522/49; 522/64; 522/100; 522/168; 523/161

(58) Field of Classification Search .................. 523/160, 523/161; 522/6, 31, 49, 64, 67, 100, 168; 347/1, 100, 102; 427/466, 508, 511, 517, 427/558
See application file for complete search history.

(56) References Cited

U.S. PATENT DOCUMENTS

| 5,641,346 | A | 6/1997 | Mantell et al. |
| 5,691,101 | A | 11/1997 | Ushirogouchi et al. |
| 5,721,020 | A | 2/1998 | Takami et al. |
| 5,889,084 | A | 3/1999 | Roth |
| 6,284,816 | B1 * | 9/2001 | Laksin et al. ............... 523/160 |
| 6,306,555 | B1 | 10/2001 | Schulz et al. |
| 6,959,986 | B2 * | 11/2005 | Ushirogouchi et al. ...... 347/100 |
| 2002/0149659 | A1 | 10/2002 | Wu et al. |
| 2003/0128264 | A1 | 7/2003 | Ishikawa et al. |
| 2004/0052967 | A1 | 3/2004 | Takabayashi |
| 2004/0201659 | A1 * | 10/2004 | Watanabe ................... 347/100 |

FOREIGN PATENT DOCUMENTS

| EP | 1 188 806 | 3/2002 |
| JP | 58-32674 | 2/1983 |
| JP | 2001-220526 | 8/2001 |
| JP | 2004-051923 | 2/2004 |
| JP | 2004-131539 | 4/2004 |
| JP | 2005-239808 | 9/2005 |
| JP | 2005-263898 | 9/2005 |
| WO | WO 02/46323 A2 | 6/2002 |

* cited by examiner

*Primary Examiner*—Patrick D Niland
(74) *Attorney, Agent, or Firm*—Harness, Dickey & Pierce, P.L.C.

(57) ABSTRACT

There is proposed an inkjet ink composition comprising a pigment component to which a resin having a basic terminal is adsorbed, a photo-acid generating agent containing an onium salt, and at least one kind of solvent which can be polymerized under the presence of an acid. The content of multivalent salt included in the onium salt is not more than 20% by weight based on a total weight of onium salt, and the content of the pigment component is confined within the range of 3 to 41% by weight based on the ink composition.

11 Claims, 1 Drawing Sheet

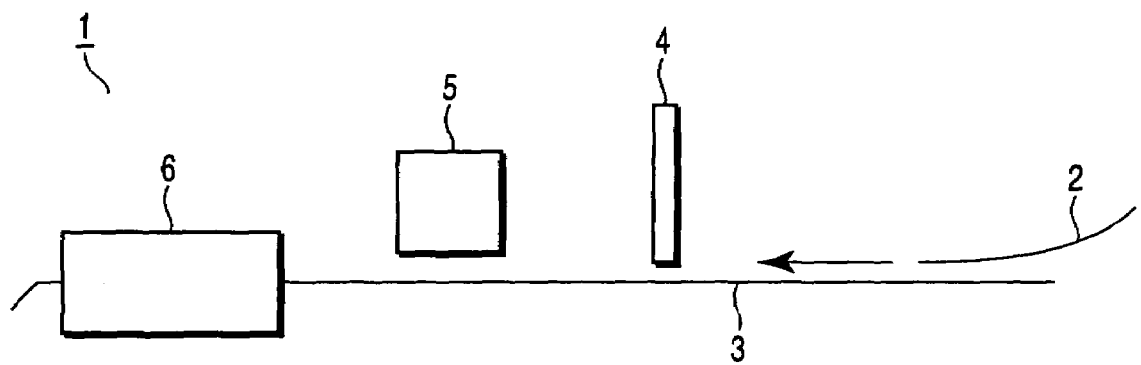
FIGURE

INKJET INK COMPOSITION AND PRINTED MATTERS CREATED USING INKJET INK COMPOSITION

CROSS-REFERENCE TO RELATED APPLICATIONS

This application is based upon and claims the benefit of priority from prior Japanese Patent Application No. 2004-222190, filed Jul. 29, 2004, the entire contents of which are incorporated herein by reference.

BACKGROUND OF THE INVENTION

1. Field of the Invention

This invention relates to an inkjet ink composition and printed matters created by using the inkjet ink composition.

2. Description of the Related Art

In recent years however, an on-demand printer which is capable of quickly coping with the diversification of needs and of minimizing stocks has been increasingly utilized. As for such an on-demand printer, an electrophotographic printer where a toner or a liquid toner is employed as well as an inkjet printer which is capable of achieving high-velocity and high-quality printing are expected to be useful. In the case of the inkjet printer, it is possible to handle a solvent type ink in a closed system until the ink is discharged onto the surface of printing matter. Moreover, since the ink can be effectively utilized without substantially generating redundant ink, it is possible to alleviate the problem of environmental contamination.

Further, a photosensitive inkjet ink as well as an inkjet printer system employing the photosensitive inkjet ink are now taken notice of. As for the photosensitive inkjet ink useful in this case, an ink composition comprising, for example, a radical polymeric monomer, a photopolymerization initiator and a pigment is typically employed. It is also proposed to employ a photopolymerizable photosensitive ink which comprises a cationic polymerizable monomer, a photocation-generating agent and a pigment. According to these techniques, since an ink layer formed using such photosensitive inks can be readily nonfluidized by the irradiation of light, it is possible to obtain a printed matter which is unharmful and of high-quality.

On the other hand, in the case of the inkjet recording apparatus which is adapted to be employed in such a quick-drying printing as described above, the printing heads are generally linearly arrayed for accelerating the printing, thus making it possible to perform the printing with one pass over a printing surface. Therefore, any error in the delivery of ink would lead to the generation of a linear defective printing (missing of printing) on the printed surface. Therefore, it is indispensable to obviate as much as possible the generation of such an error zero. Namely, it is required for an ink to be employed in this case that the ink is made up of materials which are excellent in stability, thereby making it possible to achieve very high printing precision and delivery stability. Such requirements are generally fulfilled by the employment of pigment particles having an extremely fine average particle diameter and by the stabilization of the bond between the pigment particles and a dispersing agent.

Since the aforementioned ink of cationic polymerization type is capable of enhancing the adhesion of the radical polymerization type ink as well as capable of modifying the low sensitivity of the radical polymerization type ink that may result from oxygen inhibition, the demand for this cationic polymerization type ink is expected to be increased in future.

These photo-curing type inkjet inks however are accompanied with a problem that when pigment is employed as a coloring material, the dispersibility of the ink would become unstable with time. This problem would become more prominent where color pigments are employed in these photo-curing type inkjet inks.

Once the viscosity, surface tension, elastic force, etc. of the ink fluctuate on account of the deterioration of dispersibility of pigment as described above, it may lead to the turbulence in trajectory configuration of ink, printing error, linear missing of ink delivery, the deterioration of printing reproducibility, or in the worst case, may lead to a critical state such as the failure of delivery of ink, the clogging of ink, etc. Therefore, this problem is very serious.

BRIEF SUMMARY OF THE INVENTION

Therefore, one of the objects of the present invention is to provide an inkjet ink composition which is excellent in stability of the components thereof, and free from the discharge failure of ink and from the clogging of ink, thereby rendering the ink composition suitable for use as a UV-curing type inkjet ink for on-demand printing.

Another object of the present invention is to provide a printed matter which is excellent in quality of printed images and free from missing of printing.

According to one aspect of the present invention, there is provided an inkjet ink composition comprising:

a pigment component having a resin comprising a basic terminal adsorbed thereto, the pigment component having an average particle diameter of 200 nm or less;

a photo-acid generating agent containing an onium salt; and at least one kind of solvent which can be polymerized under the presence of an acid;

wherein the content of multivalent salt included in the onium salt is not more than 20% by weight based on a total weight of onium salt; and wherein the content of the pigment component is confined within the range of 3 to 41% by weight based on the ink composition.

According to one aspect of the present invention, there is provided a printed matter comprising a cured substance of the inkjet ink composition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawing, which is incorporated in and constitutes a part of the specification, illustrates an embodiment of the invention, and together with the general description given above and the detailed description of the embodiments given below, serves to explain the principles of the invention.

The single FIGURE is a schematic diagram illustrating an inkjet ink recording apparatus which employs the inkjet ink according to the embodiments of the present invention.

DETAILED DESCRIPTION OF THE INVENTION

Next, various embodiments of the present invention will be explained as follows.

It has been found out by the present inventors as a result of intensive studies on the dispersibility of photo-curing type inkjet ink that the dispersibility of pigment tends to be deteriorated by the presence of an onium salt-based compound to be employed as a photo-acid generating agent in a cationic curing type ink. The present invention has been accomplished based on the aforementioned finding made by the present inventors.

The inkjet ink composition according to one embodiment of the present invention comprises a photo-acid generating agent which is capable of generating an acid as it is irradiated with light, a pigment component, and at least one kind of solvent which can be polymerized in the presence of an acid. Namely, the inkjet ink according to this embodiment is formed of a chemically amplified type photosensitive composition. The term "inkjet ink" herein means an ink which is fluid at the ordinary temperature, more specifically an ink having a viscosity of 50 cp or less, more preferably 30 cp or less at a temperature of 25° C.

When this kind of ink is irradiated with light, an acid generates from the photo-acid generating agent, and then, this acid acts as a catalyst for the crosslinking reaction of the polymeric compound and at the same time, diffuses in the ink layer. Moreover, the diffusion of the acid as well as this crosslinking reaction where the acid is enabled to act as a catalyst can be accelerated by applying heat to the ink layer. Different from the radical polymerization, this crosslinking reaction would not be obstructed by the presence of oxygen. As a result, a plurality of crosslinking reactions occur using only one photon, thereby making it possible to realize a high sensitivity and a high density printing. Moreover, the crosslinking reaction can take place quickly even in a deep portion of the ink layer and in the interior of the absorptive media. Therefore, as compared with the case of radical polymerization system, the ink layer to be obtained in this manner would become far more excellent in adhesion.

Accordingly, by using the ink of this kind, it is now possible to quickly non-fluidize a layer of the ink by subjecting the ink layer to the irradiation of light and heating subsequent to the discharge of the ink onto the printing surface. Namely, it is now possible to obtain a printed matter of high quality without necessitating the provision of a large scale exposure system. Incidentally, the non-fluidized film to be obtained in this manner may be one exhibiting thermoplasticity (i.e. a film that can be re-fluidized through heating, the fluidity retention time thereof may be very short).

Further, unlike the ink which makes the most of radical polymerization, the ink of this kind can be formulated without necessitating the employment of a radical-generating agent having carcinogenic properties or a radical polymerizable monomer which is irritant to the skin and badly smelling. Therefore, the ink according to this embodiment can be easily handled.

Further, in the embodiments of the present invention, at least part of the solvent is constituted by the aforementioned polymerizable compound and more typically, the solvent is almost entirely constituted by the aforementioned polymerizable compound. Accordingly, if the mixing ratio of such a polymerizable compound to the entire volume of the solvent is sufficiently high, there would be a little possibility of generating the volatilization of an organic solvent on the occasion of printing. Therefore, it is now possible to overcome the problem of atmospheric contamination that may result from the volatilization of an organic solvent and hence to dispense with the installation of an exhaust system or a solvent recovery mechanism.

In the case of the inkjet ink according to this embodiment of the present invention, since the employment of an organic solvent is no longer required and an ink layer applied to a printing surface can be quickly non-fluidized, printed images can be easily fixed to various printing surfaces differing in characteristics without substantially generating the bleeding of ink on the printing surfaces. Moreover, since the ink according to this embodiment is capable of containing a pigment at a high density as a coloring component, it is now possible to create a printed image or pattern which is clear and excellent in weather resistance.

Next, each of the components of the inkjet ink composition according to the embodiments of the present invention will be explained in detail.

As for the pigment component useful in this case, it is possible to employ any kinds of pigments as long as they are known as a coloring material and are fundamentally capable of diffusing into a solvent. Especially in the case of cationic curing type materials, since an acid is employed in the curing mechanism thereof, it is preferable to employ pigments which can be hardly discolored in the presence of the acid.

For example, it is possible to employ photoabsorptive pigments. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate; nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and isoindolinone pigment.

As for the pigments that can be employed in the manufacture of a black ink, it is possible to employ carbon black such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include C.I. Pigment Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 139 and Pigment Yellow 180. In particular, it is more preferable, among these yellow pigments, to employ imidazolone pigments which can be hardly discolored by the effect of acid, especially preferable examples of which being Pigment Yellow 139 and Pigment Yellow 180.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 177, C.I. Pigment Red 170, C.I. Pigment Red 176, C.I. Pigment Red 122 and C.I. Pigment Violet 19. In particular, it is more preferable, among these magenta pigments, to employ quinacridone pigments which can be hardly discolored by the effect of acid, especially preferable examples of which being Pigment Red 122, Pigment Violet 19 and Pigment Red 57:1, which are all excellent in dispersibility.

Further, as for the pigments that can be employed in a cyanine ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60. In particular, it is more preferable, among these cyanine pigments, to employ phthalocyanine pigments which can be hardly discolored by the effect of an acid, especially preferable examples of which being Pigment Blue 15:3.

Further, it is also useful, as a color component, to employ white pigments such as natural clay, white lead, zinc white and metal carbonates such as magnesium carbonate, metal oxides such as barium and titanium. The inkjet ink containing white pigments can be employed not only in white printing but also in the amendments of printing or underlying images through overwriting.

With respect to the pigments that can be used as a color component in the present invention, there is not any particular limitation as long as they are capable of exhibiting optical coloring and tinting functions which these pigments are essentially required to have. The pigments to be employed in the inkjet ink of the present invention may be further provided, in addition to the coloring and tinting properties, with other properties such as magnetism, fluorescence, conductivity, dielectric property, etc. If a pigment provided with these various properties is employed, it may become possible to obtain a printed image having various functions. Further, the inkjet ink may additionally contain powder which is capable of enhancing the heat resistance or physical strength of the ink.

As for fluorescent pigments, it is possible to employ not only inorganic fluorescence materials but also organic fluorescence materials. As for the inorganic fluorescence materials, specific examples of which include $MgWO_4$, $CaWO_4$, $(Ca,Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescence materials, specific examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ∈-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl)aminonaphthalene-1-sulfonic acid, 5-iodoacetamide fluorescein, N-(1-anilinonaphthyl 4)maleimide, N-(7-dimethyl-4-methylcumanyl)maleimide, N-(3-pyrene) maleimide, eosin-5-iodoacetamide, fluorescein mercury acetate, 2-[4'-(2"-iodoacetamide)]aminonaphthalene-6-sulfonic acid, eosin, Rhodamine derivatives, organic electroluminescent (EL) dye, organic EL polymer, organic EL crystal and dendrimer.

As for the powder to be employed for enhancing the heat resistance or physical strength of ink layer, examples of which include oxides or nitrides of aluminum and silicon, filler and silicon carbide. For the purpose of providing the ink layer with electric conductivity, the ink may further contain conductive carbon pigment, carbon fiber, or powder of copper, silver, antimony and other noble metals. Iron oxide powder and ferromagnetic powder are suited for use in providing the ink layer with magnetic property. It is also possible to incorporate metal oxide powder such as tantalum oxide or titanium oxide exhibiting high dielectric property into the inkjet ink.

It is also possible to incorporate dyes as an auxiliary component of pigment into the inkjet ink. For example, it is possible to employ, as an auxiliary component, dyes which are low in acidity and basicity and excellent in solubility to a solvent, such as azoic dye, sulfur (building materials) dye, disperse dye, fluorescent brightening agent and oil soluble dye. Among them, it is more preferable to employ oil soluble dye such as azo dye, triaryl methane dye, anthraquinone dye and azine dye. Specific examples of such oil soluble dye include C.I. Solvent Yellow-2, 6, 14, 15, 16, 19, 21, 33, 56, 61 and 80; Diaresin Yellow-A, F, GRN and GG; C.I. Solvent Violet-8, 13, 14, 21 and 27; C.I. Disperse Violet-1; Sumiplast Violet RR; C.I. Solvent Blue-2, 11, 12, 25 and 35; Diaresin Blue-J, A, K and N; Orient Oil Blue-IIN, #603; and Sumiplast Blue BG.

These pigments and dyes described above may be employed singly or in combination of two or more for the purpose of enhancing the photoabsorbance, chroma and color vision.

Furthermore, these pigments may be modified with a suitable functional group for the purpose of enhancing the bonding properties of these pigments to a dispersing agent to be discussed hereinafter. For example, it may be preferable for the purpose of greatly enhancing the dispersibility of pigment to formulate the pigment so as to contain, on the surface thereof, a group exhibiting strong bonding properties to amino group, i.e. a typical terminal group of dispersing agents, such as carboxylic group, sulfonic group or phosphoric group. The pigments of this kind can be created by various treatments such as the oxidation of the surface of pigment crystal with an oxidizing agent, the modification of the surface of pigment with a sulfonating agent, and the adsorption of a compound (synergist) which is capable of exhibiting not only a strong physical adsorption to the pigment but also affinity to the resinous dispersing agent on the surface of pigment. Among them, the pigment that has been modified directly with a sulfonating agent is excellent not only in bonding strength between the pigment and a dispersing agent but also in density of bonding points, thereby making the pigment excellent in stability and suitable for use.

In the employment of the pigments mentioned above, they are dispersed in a predetermined dispersing medium to prepare a pigment dispersion. The content of the pigment component in the pigment dispersion should preferably be confined within the range of 3% to 41% by weight. If the content of the pigment component is less than 3% by weight, it would become difficult to secure a sufficient color density when the pigment dispersion is employed as coloring material in a subsequent working process. On the other hand, if the content of the pigment component is increased over 41% by weight, the stability of the pigment dispersion may be degraded. Therefore, the content of the pigment component should more preferably be confined within the range of 4% to 27% by weight based on the pigment dispersion. A polymeric dispersing agent having a basic terminal may be employed for suitably dispersing the pigment.

This polymeric dispersing agent is capable of entering into the interface between pigment particles, thereby preventing the aggregation of the pigment particles and also capable of enhancing the affinity of the pigment particles to the dispersing medium, thereby preventing the pigment particles from settling. Basically, any kind of resin component which is excellent in affinity to a dispersing medium and is capable of exhibiting a steric separability for preventing the aggregation of the pigment particles can be employed as the aforementioned polymeric dispersing agent. For example, it is possible to employ polymeric dispersing agents which comprise, as a major component, at least one selected from the group consisting of vinyl polymer or copolymer, acrylic polymer or copolymer, polyester, polyamide, polyimide, polyurethane, amino-based polymer, silicon-containing polymer, sulfur-containing polymer, fluorine-containing polymer and epoxy resin.

The polymeric dispersing agents should preferably be constructed such that the terminal moiety of the polymer is provided with high bonding property or affinity to the pigment and the main chain of the polymer is provided with affinity to the dispersing medium as well as with physical repulsive force or electrostatic repulsive force for preventing the reaggregation thereof with pigment particles. For example, it is preferable to employ polymers having a solubility parameter which is substantially equivalent to that of the dispersion medium (about ±5 MPa$^{1/2}$), a molecular weight ranging from several hundreds to tens of thousands, a polymerization degree ranging from 10 to about 200, and a Tg value ranging from 10° C. to 200° C. Furthermore, it is desirable to employ polymers whose terminal moieties are capable of exhibiting a relatively strong chemical bonding property (such as covalent bond, electrostatic force), thus exhibiting excellent affinity to the pigment. Generally, it is possible to provide the resin with the aforementioned composite functions by formulating the resin as a copolymer comprising two or more monomers.

The terminal moiety of the polymer which is constructed as described above may not necessarily be limited to only one, but may be introduced into any distal end of the polymer or into a tandem end of tandem polymer that has been graft-copolymerized. These polymers are not only strong in bonding property but also liable to form steric hindrance which is effective in suppressing the reaggregation among pigment particles.

As for the monomers for synthesizing such polymers, specific examples thereof include styrene, substituted styrene, (metha)acrylic ester, (metha)acrylic acid, (metha)acrylic amide, maleic acid, maleic anhydride, maleic ester, itaconic acid, itaconic ester, hydroxystyrene and hydrogen atom-substituted derivatives of hydroxystyrene. Polymers having an ester side chain provided with long chain alkyl, polyether, polycarbonate or polyester are advantageous in creating the aforementioned tandem polymer.

Furthermore, it is possible to employ the following compounds as a polymer useful in this case. Namely, the polymers useful herein include polyester compounds which can be obtained through dehydrocondensation between a dihydroxy compound and dicarboxylic acid such as poly(oxyphthaloyloxymethylene-1,4-phenylenemethylene) and poly(1,4-cyclohexylenedimethylene succinate); polyamides which can be obtained through condensation between diamine and dicarboxylic acid, e.g. between adipic acid and hexamethylene diamine, or through ring-opening of cyclic lactone such as ∈-caprolactam; some kinds of polyamides which are relatively low in Tg among the polyamides that can be obtained through condensation between tetra-carboxylic acid such as pyromellitic acid and aliphatic diamine; polyurethane resin which can be obtained through a reaction between isophorone dicyanate or aliphatic diisocyanate and dihydroxy compound; polyvinyl pyridine compounds; polydimethyl siloxane and ladder polymers thereof; polyvinyl alcohols; polyvinyl ethers; and polyether-based polymer which can be obtained through polymerization of an oxirane compound having a relatively rigid skeleton. The terminals of these polymers may be capped with a compound having a functional group such as amino group, phosphoric group, etc., each capable of exhibiting affinity to pigments or synergists.

When the terminal moieties of the aforementioned dispersing agent are made stronger in basicity or provided with a plurality of basic groups or with a stronger basic group, the electrostatic adsorbability of pigment surface or synergist to an acidic group can be increased, and hence such a structure is preferable for use. More specifically, a polymeric dispersing agent having a terminal substituent group (such as monovalent amino compound) whose pKb value is 4 or less is more preferable for use. In this case however, since it is impossible to measure the basicity of the substituent group, the basicity of the substituent group is determined, as a matter of fact, by referring to the pKb value of a methane compound having the same substituent group. Specific examples of such a substituent group include, for example, a group having dialkyl amino terminal group having one to two carbon atoms; alkyl amino group having hydrogen atom; a group having a piperidine or pyrrolydine skeleton; a group having a structure exhibiting a relatively strong basicity such as Hunig's base, diazabicycloundecene (DBU) or proton sponge; a compound having guanidine skeleton; etc.

The ratio these resinous components that have been adsorbed onto the pigment may be generally confined within the range of 1 to 50% by weight based on the weight of pigment. If the ratio of the resinous components falls outside this range, the dispersion stability of the pigment would be badly degraded or the resultant dispersion would be very viscous. In particular, when such a dispersion is employed for inkjet printing, the discharge stability of ink would be badly affected. As long as the mixing ratio is confined within the range which does not badly affect the photosensitivity and hardness cured of ink, part of the resinous component may be left remained undissolved in the solvent without being adsorbed onto the pigment. A more preferable content of the resinous components relative to the pigment may differ to a certain extent depending on the kinds of pigment.

For example, in the case of carbon black, the concentration of the pigment in the ink should preferably be confined within the range of 3% to 28% by weight and the content of the resinous dispersing medium component should preferably be confined within the range of 10 to 30% by weight based on the weight of pigment. In the case of color pigments, for example, in the case of benzimidazole-based yellow pigment, the concentration of the pigment in the ink should preferably be confined within the range of 3% to 28% by weight and the content of the resinous dispersing medium component should preferably be confined within the range of 15 to 39% by weight based on the weight of pigment; in the case of phthalocyanine-based cyan pigment, the concentration of the pigment in the ink should preferably be confined within the range of 3% to 28% by weight and the content of the resinous dispersing mesium component should preferably be confined within the range of 10 to 30% by weight based on the weight of pigment, and in the case of quinacridone-based magenta pigment, the concentration of the pigment in the ink should preferably be confined within the range of 3% to 28% by weight and the content of the resinous dispersing medium component should preferably be confined within the range of 20 to 50% by weight based on the weight of pigment.

In the case of the inkjet ink, the average particle diameter of the colorant component or of the powder component should be as small as possible, provided that it would not badly affect the weather resistance of coloring material. Generally speaking, the average particle diameter of the colorant component or of the powder component should be confined to ⅓ or less, more preferably about 1/10 of the pore diameter of the nozzle to be employed for discharging the inkjet ink. Incidentally, the pore diameter of the nozzle is typically 10 μm or less, more preferably 5 μm or less. Therefore, a preferable particle diameter of the colorant component or of the powder component should be limited to not larger than 0.35 μm, the typical average particle diameter thereof being confined within the range of 0.05 to 0.2 μm. If the average particle diameter of the pigment is too small exceeding from the aforementioned lower limit, the weather resistance of the pigment may be deteriorated.

In the inkjet inks according to the embodiments of the present invention, although all of the pigments manufactured according to the aforementioned methods are admitted to have the stability-enhancing effects mentioned above, such stability-enhancing effects would become more prominent especially in the magenta pigment. It has been found out by the present inventors that, as compared with other colors, the magenta pigment is inferior in adsorbability thereof to the dispersing agent and more liable to aggregate by the effects of onium salts.

The photo-acid generating agents which are capable of generating an acid as they are irradiated with light may comprise onium salts. Examples of onium salts useful in this case are diazonium salts, phosphonium salts, sulfonium salts and iodonium salts having, as a counter ion, fluoroboric acid anion, hexafluoroantimonic acid anion, hexafluoroarsenic acid anion, trifluoromethane sulfonate anion, paratoluene sulfonate anion or paranitrotoluene sulfonate anion.

Specific examples of such onium salts include the compounds represented by the following chemical formulas for instance.

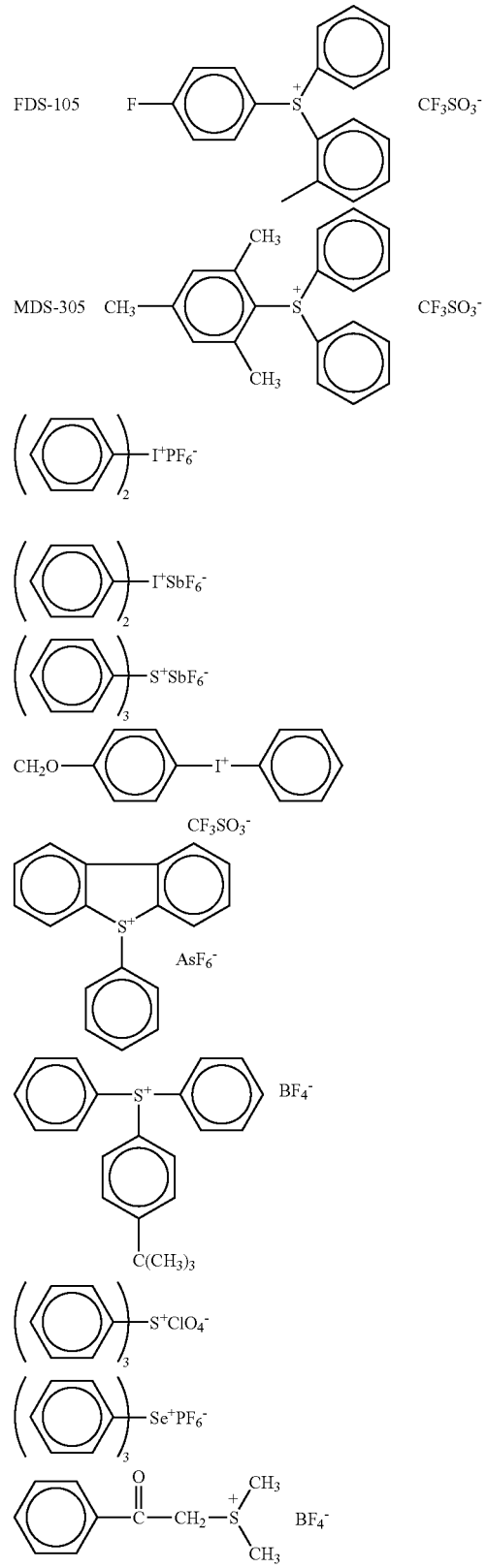

-continued

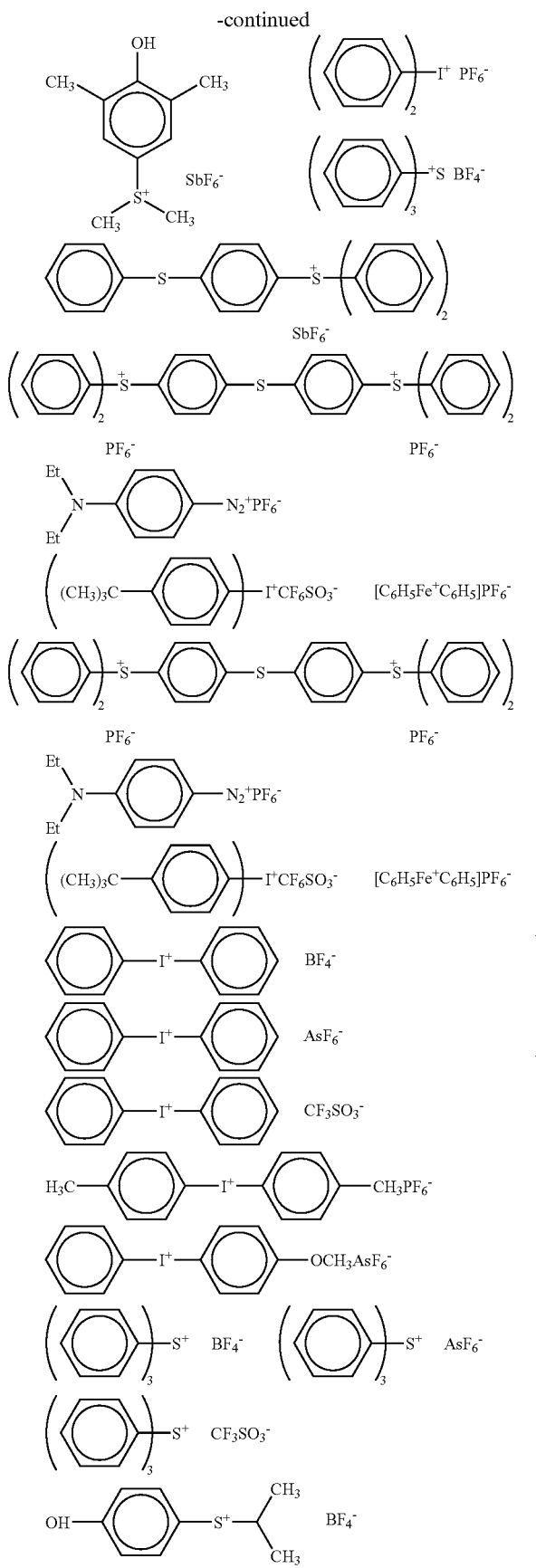
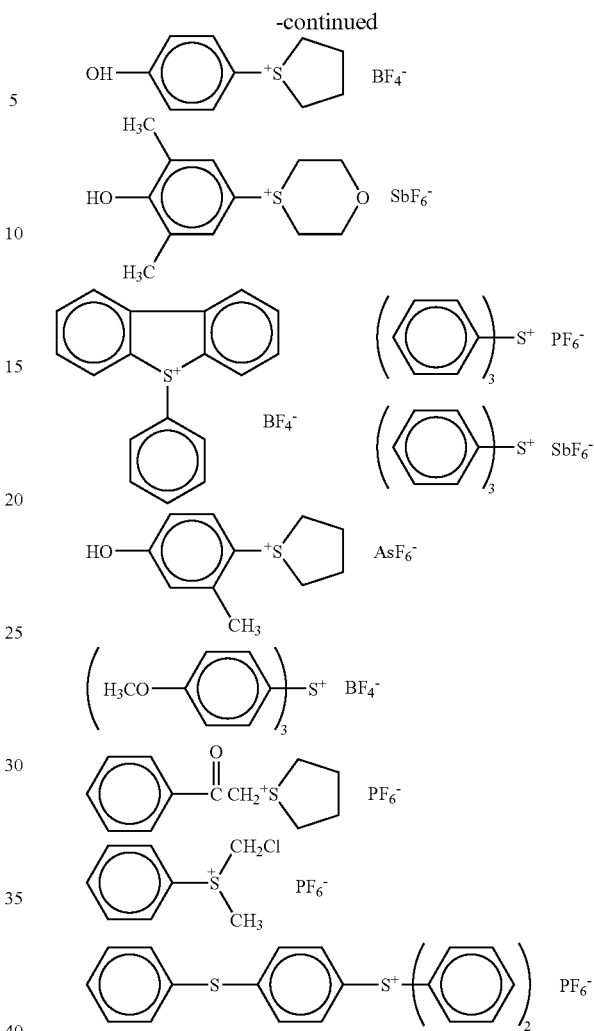

Specific examples of such onium salts which are available in the market include MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203 (CAS. NO. [127855-15-5]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO. [116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.); UVACURE1591 (DAICEL UCB Co., Ltd.); UVI-6992 or UVI-6976 (Dow Chemical Co., Ltd.); and ESACURE-1064 (Lamberty Co., Ltd.).

Among these onium salts, although sulfonium salts and iodonium salts are generally excellent in stability, these salts are known as unavoidably composed of a mixture comprising a monovalent salt (a salt comprising a monovalent cation and one anion) and a few % to about 75% of bivalent or polyvalent salt (for example, a salt comprising a bivalent cation and a couple of anions) due to the manufacturing process thereof, and hence, these salts available in the market are formed of a mixture. Since polyvalent salt is capable of expanding the photosensitive wavelength to a longer wavelength side, the polyvalent salt is known to be generally high in sensitivity. Due to this advantage, the bivalent salt is occasionally deliberately incorporated into the ink. Examples of such a formulation are available in the market as exemplified by UVA-CURE1591 (DAICEL UCB Co., Ltd.); UVI-6992 or UVI-6976 (Dow Chemical Co., Ltd.); and ESACURE-1064 (Lamberty Co., Ltd.). It has been found out by the present inventors that the presence of the polyvalent salts of this kind imposes a great influence on the stability of a dispersed solution of inkjet pigment which necessitates the employment of very fine particles, so that as much exclusion as possible of these polyvalent salts is desirable not only for the improvement of the dispersion stability of the pigment but also for the enhancement of the discharge performance of inkjet ink. The reason for this is due to the fact that the presence of polyvalent salts causes weakening of linkage between the pigment particles and the dispersing agent, thus contributing to the occurrence of gelation or aggregation.

Therefore, according to the embodiments of the present invention, the content of polyvalent salts is limited to at most 20% by weight based on the total weight of entire onium salts. More preferably, the content of the polyvalent salts should be limited to at most 5% by weight, most preferably 0%. However, as long as the content of the polyvalent salts can be substantially limited to 1% by weight or less, the effects of the present invention can be sufficiently secured. The reduction of the content of the polyvalent salts can be realized by adopting a synthesizing method which is capable of selectively preventing, as much as possible, the generation of polyvalent onium salts or by adopting a method to fractionate the polyvalent salts that have been produced. More specifically, in the case of sulfonium salt for example, diphenylsulfoxide and phenylsulfide are allowed to react with each other together with hexafluorophosphoric acid in the presence of an acid catalyst to obtain sulfonium salt. Generally speaking, as the reaction conditions become more severe, there will be increasing possibilities of generating polyvalent salts. Therefore, by making the reaction conditions more moderate or by deriving the source of hexafluorophosphoric acid from potassium salts, the content of polyvalent salts can be reduced to less than several %. Furthermore, by fractionating polyvalent salts from the salts in the mixture obtained from the aforementioned reaction by chromatographic separation or colloidal salting-out/centrifugal separation, the content of polyvalent salts can be substantially completely eliminated.

Among these onium salt compounds, the employment of fluorophosphate salt of aryl sulfonium or aryl iodonium is more preferable since these salts are especially excellent in stabilizing color pigments against the aggregation thereof. Even these monovalent onium salts, since they act to gradually substitute with time the terminal amine resin employed as a dispersing agent, these onium salts should preferably be constructed so as to enable these onium salts to restrain from approaching the linking portion between the surface of pigment and the terminal moiety of dispersing agent. This can be made possible by using an onium salt compound having, in its structure, a relatively large substituent group. Further, since the adsorption of ion to the surface of pigment is minimized by the steric hindrance of onium salt, the benzene ring in the onium salt should preferably contain an organic group having 1 to 20 carbon atoms. More preferably, at least 50 mol % of the benzene rings should be constructed to have an organic group having 4 to 20 carbon atoms. When the onium salt is constructed in this manner, it is possible to enhance not only the dispersion stability of ink but also the safety of ink due to the fact that the scattering of decomposed matters into air atmosphere during the optical reaction can be suppressed. Since these onium salt compounds are high in solubility to a solvent, it is also possible to suppress the phenomenon of precipitation of salt in the ink. As a result, the generation of particles having a diameter of several micrometers that may become a cause for discharge failure of ink can be minimized and hence the employment of these onium salt compounds is very desirable.

Since the employment of monovalent onium salts leads to the shift of photosensitive wavelength to a shorter wavelength side, the ink containing the monovalent onium salts will exhibit a tendency of deteriorating the photosensitivity thereof. When the monovalent onium salts include in their structures an aromatic substituent group having VI group elements such as sulfur or oxygen in its heterocyclic group or as a linking group, the aforementioned problem would be overcome and hence the inclusion of such an aromatic substituent group is desirable.

More specifically, the employment of onium salts containing in their structures a relatively large organic group as shown in the following general formula (1) or (2) is advantageous in the respects that the dissolution stability thereof is excellent and dispersion stability thereof is also excellent.

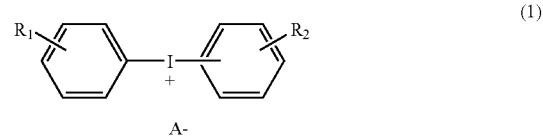

(1)

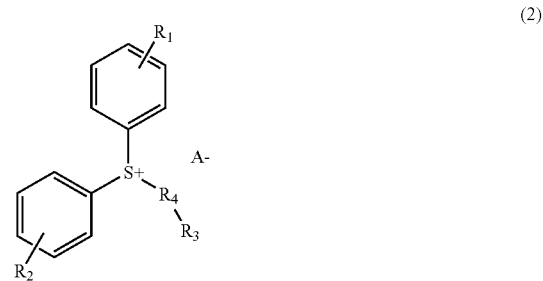

(2)

wherein $A^-$ is a fluorophosphate anion; and $R_1$, $R_2$ and $R_3$ may be the same or different and at least one of $R_1$, $R_2$ and $R_3$ is an organic group having 4 to 20 carbon atoms, the rest being an organic group having hydrogen atom and 1 to 20 carbon atoms; $R_4$ is a bivalent aromatic substituent group or a bivalent aromatic substituent group containing in its structure a VI group atom.

As for the organic group which can be introduced as $R_1$, $R_2$ and $R_3$ into the aforementioned formulas, specific examples thereof include alkyl group having 4 to 20 carbon atoms such as propyl, butyl, hexyl, heptyl, octyl, nonyl, decanyl, etc.; alkyloxy group having 4 to 20 carbon atoms such as propyloxy, butyloxy, hexyloxy, heptyloxy, octyloxy, nonyloxy, decanyloxy, etc.; and a substituent group having 4 to 20 carbon atoms and a polyethylene oxide skeleton into which ethylene glycol is dehydrocondensed. Further, as for the bivalent aromatic substituent group which can be introduced as $R_4$ into the aforementioned formula, specific examples thereof include a group having phenylene or biphenylene; a group having a phenylene sulfide skeleton such as phenylene sulfide and phenylene disulfide; a group having a thiophene skeleton such as benzothiophenylene, thiophenylene and bithiophenylene; and a group having a furan skeleton such as furanylene and benzofuranylene.

Further, the aforementioned onium salts are known to suppress the generation of by-products such as malignant benzene in the process of the optical reaction thereof and hence, the employment thereof in the inkjet ink according to the present invention is very desirable in the aspects of environmental pollution and safety.

The mixing ratio of the photo-acid generating agent in the inkjet ink may be suitably selected depending on the acid generating efficiency of the photo-acid generating agent to be employed as well as on the quantity of the color component to be incorporated. According to the present invention however, in viewpoint of sensitivity of ink, the mixing ratio of the photo-acid generating agent may be generally confined within the range of 1 to 10 parts by weight, more preferably 2 to 8 parts by weight, most preferably 2 to 6 parts by weight per 100 parts by weight of the entire solvent which is polymerizable in the presence of an acid included in the inkjet ink. In order to enhance the dispersion stability of pigment and to minimize the corrosion of the piping or head member of inkjet printing apparatus, it is more preferable to concurrently incorporate a sensitizing agent (sensitizing dye) into the inkjet ink so as to make it possible to reduce the mixing ratio of the photo-acid generating agent to about 2 to 4 parts by weight per 100 parts by weight of the entire solvent.

As for the sensitizing dye, specific examples thereof include acridine compounds, benzofuravins, perylene, anthracene, thioxanthone compounds and laser dyes. Among them, dihydroxyanthracene derivatives where an organic group is substituted for the hydrogen atom of dihydroxyanthracene or thioxanthone derivatives are more preferable due to higher effects thereof. The mixing ratio of the sensitizing dye may be generally confined within the range of 20% to 100% by weight, more preferably 30% to 60% by weight based on the weight of the photo-acid generating agent.

If the mixing ratio of the photo-acid generating agent is less than 2 parts by weight per 100 parts by weight of the solvent, the sensitivity of the inkjet ink would be degraded. On the other hand, if the mixing ratio of the photo-acid generating agent exceeds 10 parts by weight per 100 parts by weight of the solvent, the increase in viscosity with time of the ink would be intensified thereby degrading the coating properties of the ink and lowering the hardness of the ink film that has been photo-cured. Further, there are possibilities that the piping or the head member of recording apparatus corrodes.

Concurrent with the addition of the aforementioned onium salt compounds, a nonpolar photo-acid generating agent which is capable of generating another kind of acid exhibiting a relatively strong acidity may be incorporated so as to make it possible to reduce the quantity of the onium salt compounds to be added and to further inhibit the aggregation of ink with time. Namely, it is preferable to employ the aforementioned onium salt compounds together with a photo-acid generating agent selected from sulfonyl compounds, sulfonate compounds, sulfamide compounds and organic halogen compounds. Among them, fluoromethane sulfonic acid and compounds which are capable of generating hydrochloric acid or bromic acid are more preferable as such a photo-acid generating agent.

As for specific examples of such a photo-acid generating agent, they include, for example, organic halide compounds such as tribromomethylphenyl sulfone or sulfonyl compounds; polyfluoromethane sulfonate compounds; sulfonate compounds such as trifluoromethane sulfonic acid ester of polyol such as polyhydroxyanthracene; sulfamide compounds such as trifluoromethane sulfonic imide of N-hydroxynaphthal imide; and organic halide compounds such as triazine halide compounds. The mixing ratio of the aforementioned onium salt compounds and nonpolar photo-acid generating agents should preferably be confined to such that 0.3 to 2 parts by weight of onium salt compounds per 100 parts by weight of the solvent and 2 to 10 parts by weight of nonpolar photo-acid generating agents per 100 parts by weight of the solvent.

Next, details about the solvent which is polymerizable in the presence of an acid will be explained.

The solvent which is polymerizable in the presence of an acid may be selected from any kinds of substances which are substantially formed of a polymerizable compound having such characteristics. This expression of "solvent is substantially formed of a polymerizable compound" is intended to include not only a situation wherein "solvent is formed exclusively of a polymerizable compound" but also a situation wherein "solvent is formed of a polymerizable compound and a minute amount of impurities which are unavoidably intermingled in the solvent". This "a minute amount of impurities which are unavoidably intermingled in the solvent" may be existed in the solvent at a concentration of, at most, not more than 10% by weight based a total weight of the solvent. More preferably, the content of "impurities which are unavoidably intermingled in the solvent" should be confined to not more than 5% by weight in general. If the content of impurities exceeds this upper limit, when residual impurities in the solvent may fly into air atmosphere, raising the problem of environmental safety or residual impurities may remain inside a cured material, thus degrading the curing property of the ink.

The polymerizable compound which is capable of crosslinking in the presence of an acid should preferably have, independently, a fluidity of about 100 cp (=mPa·s) or less at a temperature of 50° C. or less. Examples of such a polymerizable compound include compounds having a cyclic ether group such as epoxy group, oxetane group, oxorane group, etc. and having a molecular weight of 1000 or less; acrylic or vinyl compounds having the aforementioned substituent groups on their side chain; carbonate compounds; low molecular melamine compounds; vinyl ethers; vinyl carbazoles; styrene derivatives; alpha-methylstyrene derivatives; vinyl alcohol esters including esters of vinyl alcohol with acryl or methacryl; and monomers having a cationic polymerizable vinyl bond. These compounds can be employed singly or in combination of two or more.

Further, in order to keep constant the discharging performance of the inkjet, the volatility of the ink should preferably be as minimal as possible. Therefore, the boiling point of the acid polymerizable compounds should preferably be 150° C. or more.

When the polymerizable compounds which are capable of cross-linking in the presence of an acid constituted by an aliphatic skeleton or an alicyclic skeleton, the incorporation of other components mentioned above together with employment of the aforementioned polymerizable compounds would lead to the enhancement of transparency of inkjet ink when exposure and at the same time, to the provision of a suitable degree of thermoplasticity and resolubility to the cured ink layer. Therefore, it is possible to enhance the sensitivity, fixability and maintenance of the ink. Especially when the polymerizable compounds are constituted by an epoxy compound having an alicyclic skeleton, it is possible to provide the polymerizable compounds with a suitable degree of reactivity and also with a suitable degree of high boiling point and low viscosity.

As long as the quantity to be added is limited, the solvent may further contain a compound having a relatively high molecular weight and a high viscosity such as a substance which is solid at the ordinary temperatures for example. The inclusion of such a compound makes it possible to enhance the flexibility of a cured matter and also to enhance the dispersibility of pigments. Further, when the solvent contains a compound which is large in valency and high in reactivity, the hardness as well as the solvent resistance of the cured substance can be enhanced. Specific examples of such a compound include compounds having a molecular weight of 5000 or less and comprising a cyclic ether group such as epoxy group, oxetane group and oxorane group, which are bonded through a long chain alkylene group; acrylic or vinyl compounds having the aforementioned substituent groups; carbonate compounds; low molecular melamine compounds; vinyl ethers; vinyl carbazoles; styrene derivatives; alpha-methylstyrene derivatives; vinyl alcohol esters including esters of vinyl alcohol with acryl or methacryl; monomers having a cationically polymerizable vinyl bond; and oligomers formed through the polymerization of at least one of such monomers.

Further, the solvent may contain, in addition to the aforementioned compounds, at least one of compound selected from the group consisting of a homopolymer or copolymer of vinyl alcohol; acid-reactive/dehydrocondensing resins containing OH group, COOH group, acetal group, etc. and having a molecular weight of 5000 or less such as casein and cellulose; polycarbonate resins having a molecular weight of 5000 or less; copolymers to be derived from a reaction between polyamic acid, polyamino acid or acrylic acid and a vinyl compound having an acid polymerizable double bond on its side chain; copolymers to be derived from a reaction between vinyl alcohol and a vinyl compound having an acid polymerizable double bond on its side chain; and methylol melamine compounds.

Through the employment of the polymerizable compounds having an aliphatic skeleton and/or an alicyclic skeleton, the transparency of inkjet ink can be enhanced on the occasion of exposure. As a result, it is now possible to provide the cured ink layer with a suitable degree of thermoplasticity and resolubility, thereby making it possible to enhance the sensitivity, fixability and maintenance of the ink. Especially when the polymerizable compounds are constituted by an epoxy compound having an alicyclic skeleton, it is possible to provide the polymerizable compounds with a suitable degree of reactivity and also with a suitable degree of high boiling point and low viscosity.

By the employment of acid polymerizable compounds having a viscosity of 50 mPa·sec or less at a temperature of 50° C. or less, more preferably not higher than 50 mPa·sec at ordinary temperature and ordinary pressure, it is possible to provide the inkjet ink with a sufficient degree of fluidity. Further, by the employment of acid polymerizable compounds having a boiling point of 150° C. or more, it is possible to remarkably minimize the volatile matters that may be included in the inkjet ink.

If the acid polymerizable compounds are to be constituted by an epoxy compound, it is possible to employ compounds having epoxy or alicyclic epoxy group at a hydrocarbon group having a bivalent aliphatic or alicyclic skeleton each having 1 to 15 carbon atoms, or compounds having epoxy or alicyclic epoxy group at one or both sites of bivalent group having, at a portion thereof, an aliphatic chain or alicyclic skeleton.

The epoxy compounds meeting the aforementioned conditions should be incorporated into the solvent at a ratio of at least 50% by weight in order to enable the epoxy compounds to sufficiently exhibit the effects thereof. Incidentally, if the solvent is constituted entirely by these epoxy compounds, the content of the epoxy compounds should preferably be 30% by weight or more, more preferably 40% by weight or more based on a total weight of inkjet ink. If the content of the epoxy compounds is less than 30% by weight, the clogging of nozzle may occur or the thermoplasticity of the ink may be degraded.

Although there is not any particular limitation with respect to the number of epoxy group to be introduced into the aforementioned molecular skeletons, it is preferable to confine the number of epoxy group to at most two to three in order to provide the cured ink layer with flexibility and resolubility. As examples of such an epoxy compound, the compounds represented by the following general formulas (5) and (6) can be exemplified.

$$R^{51}\text{-}A1\text{-}R^{52} \quad (5)$$

$$R^{53}\text{-}A2 \quad (6)$$

In these general formulas (5) or (6), $R^{51}$ to $R^{53}$ represent individually epoxy group or epoxy group having an alicyclic skeleton; and A1 and A2 represent individually a functional group.

The compounds represented by the general formulas (5) or (6) generally have a viscosity ranging from 1 cP to about 30 cP. Therefore, the employment of these compounds is effective in sufficiently decreasing the viscosity. When the epoxy compounds exhibiting low viscosity are incorporated into the solvent at a ratio of 50% by weight or more based on the entire quantity of the solvent, it is possible to enable the epoxy compounds to sufficiently exhibit the effects thereof. However, if the epoxy compounds are incorporated excessively, the discharge of inkjet ink would be disturbed and the volatility of the inkjet ink may be undesirably increased. Therefore, the content of the epoxy compounds should preferably be limited to at most 90% by weight based on the entire quantity of the solvent.

The aforementioned compounds represented by the general formulas (5) or (6) should preferably be employed together with an epoxy compound represented by the following general formula (7). This epoxy compound represented by the following general formula (7) generally have a viscosity of as high as 20 cP to 500 cP or so. Therefore, the employment of this epoxy compound is effective in providing the cured ink layer with flexibility or conversely an increased hardness.

$$R^{54}\text{-}A3\text{-}(R^{55})_k \quad (7)$$

In the above general formula (7), $R^{54}$ and $R^{55}$ represent individually epoxy group or epoxy group having an alicyclic skeleton; and A3 represents (k+1)-valent functional group having at least alkylene group and/or an alicyclic skeleton (k is a natural number).

For example, if the aforementioned low-viscosity epoxy compound is incorporated into an inkjet ink at a ratio ranging from 50 parts by weight to 90 parts by weight based on 100 parts by weight of the inkjet ink, and at the same time, the aforementioned high-viscosity epoxy compound is incorporated into the inkjet ink at a ratio ranging from 10 parts by weight to 40 parts by weight based on 100 parts by weight of the inkjet ink, it would become advantageous in realizing a minimum fluidity (a viscosity of 30 cP or less at a temperature of 50° C.) which is required in the delivery of ink. It is especially desirable that the weight ratio between the low-viscosity epoxy compound and the high-viscosity epoxy compound is limited to the range of about 1:1 to 10:1. If low-viscosity epoxy compound and the high-viscosity compound are to be employed in combination as described above, it is desirable to employ the compounds represented by the aforementioned general formula (1) or (2) as a photo-acid generating agent and to limit the mixing ratio of the pigment to the range of 1% to 25% by weight based on the inkjet ink. By formulating the inkjet ink as described above, it is now possible to prepare an inkjet ink which is provided with a suitable degree of viscosity for discharging the ink, with photo-curing properties, with thermoplasticity and with resolubility.

When an epoxy compound represented by the following general formula (8) is employed in combination with an alicyclic epoxy compound, the adhesivity and curability of the inkjet ink can be especially enhanced among the properties of inkjet ink.

$$R^{11}-R^{12}-(R^{11})_j \quad (8)$$

In this general formula (8), $R^{11}$ is glycidyl ether group; $R^{12}$ is alkylene or hydroxyl-substituted alkylene group having 1 to 6 carbon atoms, or alkylene group having an alicyclic or hydroxyl-substituted alicyclic skeleton having 6 to 15 carbon atoms; and j is an integer ranging from 1 to 3.

As for specific examples of the aforementioned epoxy compounds, they include alicyclic epoxy compounds such as Celloxide 2021, Celloxide 2021A, Celloxide 2021P, Celloxide 2081, Celloxide 2000 and Celloxide 3000(limonene dioxide) (all available from DAICEL Chemical Industries Ltd.); (metha)acrylate compounds having epoxy group, such as Cyclomer A200 and Cyclomer M100; methacrylate having methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401. It is also possible to employ alicyclic epoxy compounds (such as Cylacure; Dow Chemical Co., Ltd, U.S.); low molecular weight phenol compounds which are hydrogenated and aliphatized with terminal hydroxyl group thereof being substituted by a group having epoxy; glycidyl ether of polyhydric aliphatic alcohol/alicyclic alcohol such as ethylene glycol, glycerin, neopentyl alcohol, hexanediol and trimethylol propane; and glycidyl esters of hexahydrophthalic acid or hydrogenated aromatic polyhydric carboxylic acid.

Further, as long as the quantity to be added is confined to such that would not increase the viscosity exceeding the upper limit thereof, the ink may further contain a transparent liquid epoxy resin which is excellent in weather resistance and high in Tg. For example, epoxidized polybutadiene such as Epolead PB3600 and PB3600M; EHPE3150 and EHPE3150CE (trademark, DAICEL Chemical Industries., Ltd.) may be included in the ink. When these compounds are incorporated into the inkjet ink, the chemical resistance of printed images can be enhanced. In addition to these epoxy resins, it is also possible to incorporate lactone-modified alicyclic epoxy resin, examples of which including Placcell GL61, GL62, G101, G102, G105, G401, G402, G403X (trademark, DAICEL Chemical Industries., Ltd.).

Among these alicyclic epoxy compounds, the employment of Celloxide 2000, Celloxide 3000, and compounds to be derived from the modification of alcohols such as a-pinene oxide ethylene glycol, glycerin, neopentyl alcohol and hexane diol into glycidyl ethers is preferable in terms of viscosity and volatility.

When specific components are incorporated at a predetermined ratio as described below, the cured ink layer to be obtained would become excellent in hardness and adhesivity in addition to sufficient photosensitivity. Namely, a specific example of such a preferable composition is a mixture comprising, as a combination of compounds which are polymerizable in the presence of an acid, 30 to 70 parts by weight of an alicyclic epoxy compound having a terpenoid skeleton or a norbornane skeleton, 30 to 70 parts by weight of epoxy compound where the glycidyl ether group has an aliphatic skeleton having not more than six carbon atoms; as a photo-acid generating agent, 1 to 6 parts by weight of a hexafluorophosphate compound having a phenyl sulfonium skeleton; and as a coloring component, 1 to 10 parts by weight of pigment.

As for specific examples of the alicyclic epoxy compound, they include for example limonene (di)oxide, (di)oxabicycloheptane and substituted compounds thereof. As for specific examples of the epoxy compound having an aliphatic skeleton having not more than six carbon atoms, they include for example neopentylglycol diglycidyl ether, ethyleneglycol diglycidyl ether, glycerol di(tri)diglycidyl ether, and 1,6-hexanediol diglycidyl ether. Among them, a combination of limonene dioxide and neopentylglycol diglycidyl ether is most preferable. Incidentally, if the number of carbon atom in the aliphatic skeleton is exceeded 6, the hardness and adhesivity of the cured ink layer may be degraded. Incidentally, even if the number of carbon atom in the aliphatic skeleton is exceeded 6, if an alicyclic skeleton is included in the structure of the aliphatic skeleton, it would be possible to secure a sufficient hardness of the cured ink layer. Namely, it is possible, in this case, to contain up to 15 carbon atoms without substantially degrading the features of the cured ink layer. Specific examples of such a compound are hydrogenated bisphenol A and glycidyl-etherified bisphenol. However, since these compounds are generally high in viscosity, it is more preferable to employ the aforementioned epoxy compounds having not more than six carbon atoms.

When different kinds of epoxy compounds are employed in combination as described above, the ink layer after the curing thereof can be refluidized at a temperature of at least 50° C. or more, preferably about 80° C. or more, the fixing or transcription of the ink layer can be conveniently performed. Furthermore, in this case, the ink layer after the curing thereof can be redissolved in an inkjet ink or dissolved in lower alcohols such as ethanol which is relatively safely handled or in an organic solvent consisting of low boiling petroleum components such as isoper. Therefore, it is possible to inhibit the occurrence of clogging of nozzle, and even if the clogging of nozzle occurs, it can be easily eliminated. Namely, the maintenance of printing head can be remarkably facilitated.

This printed matter is required to have specific properties which differ depending on the specific use thereof. For instance, when this printed matter is to be applied to the outer surface of a can or a PET bottle, or to the outer surface of a container made of an oily material, the printed images on the printed matter are required to be excellent in solvent resistance. Further, in order to cope with a high speed printing, the ink may be required to be cured at a higher curing rate.

In that case, the dispersion medium may further contain, in addition to the aforementioned alicyclic or aliphatic epoxy compounds, compounds having a phenolic hydroxyl group as described above (for example, glycidyl ether of bisphenol A, and glycidyl ether of phenolic oligomer including phenol novolac and polyhydroxystyrene), or ordinary aromatic epoxy compounds such as styrene oxide in such a quantity that would not increase the viscosity exceeding the upper limit thereof.

In a situation where high speed printing of several tens meters per minute is demanded or where the resistance to a solvent is required, these requirements can be met by incorporating, as a solvent which can be polymerized in the presence of an acid, an oxetane compound in the dispersion medium. However, since the incorporation of the oxetane compound as a major component in the dispersion medium generally leads to an increase of viscosity, it is desirable to employ an aliphatic or alicyclic epoxy compound and/or an aliphatic or alicyclic oxetane compound of bi- or higher valency. When an aliphatic or alicyclic oxetane compound having ether linkage in part of the structure thereof is employed, the surface tension of the ink would be increased and, at the same time, the dispersibility of pigment would be enhanced. A preferable range of the mixing ratios of these oxetane compound and epoxy compound would be: 0 to 50% by weight of aliphatic or alicyclic oxetane compounds and 0 to 50% by weight of aliphatic or alicyclic epoxy compounds when the solvent resistance of the cured ink layer is taken into consideration. If the mixing ratios of these oxetane compound and epoxy compound fall outside these ranges, at least any one of the curing rate, discharge performance and solvent resistance of the ink may deteriorate.

Specific examples of aliphatic or alicyclic oxetane compounds of bi- or higher valence include di[1-ethyl(3-oxetanyl)]methylether, 3-ethyl-3-(2-ethylhexyloxymethyl)oxetane, alicyclic compounds comprising at least one oxetane-containing group in the alicyclic group such as [(1-ethyl-3-oxetanyl)methoxy]cyclohexane, bis[(1-ethyl-3-oxetanyl)methoxy]cyclohexane or bis[(1-ethyl-3-oxetanyl)methoxy]norbornane, and ether compounds comprising aliphatic polyhydric alcohol such as ethylene glycol, propylene glycol and neopentyl alcohol, to which oxetane-containing alcohol such as 3-ethyl-3-hydroxymethyl oxetane is dehydrocondensed. The aforementioned aliphatic or alicyclic oxetane compounds can be manufactured through a desalt-condensation reaction between alkali metal salts of corresponding alicyclic or aliphatic alcohols and oxetane compounds having halogen.

When a further reduction of viscosity and a further enhancement of cured hardness are required in addition to the aforementioned enhanced curing rate and solvent resistance of printed image, it is preferable to employ vinyl ether compounds represented by the following general formula (9) as one component of the dispersion medium. These vinyl ether compounds can be employed singly or as a mixture of two or more. Incidentally, as for specific examples of these vinyl ether compounds, ones which are bonded to methylene group of aliphatic glycol derivatives or of cyclohexane dimethanol are generally well known. These vinyl ether compounds are however accompanied with problems that the polymerization thereof is considerably obstructed by the presence of pigment. Whereas the compounds having a vinyl ether group which is directly attached to a alicyclic skeleton or an aromatic skeleton as represented by the following general formula (9) are excellent in curability even if a pigment is co-existed therewith. The mixing ratio of these vinyl ether compounds should preferably be 50% by weight or less based on the total weight of inkjet ink in order to secure the thermoplasticity of the ink. However, if a further increased solvent resistance and a further increased hardness are required even in the sacrifice of thermoplasticity, the content of the vinyl ether compounds may be increased up to the entire volume of the solvent which is curable in the presence of an acid.

$$R^{13}—R^{14}—(R^{13})_p \quad (9)$$

wherein $R^{13}(s)$ is a group selected from vinyl ether group and hydroxyl group wherein at least one of $R^{13}(s)$ is vinyl ether group or propenyl ether group; $R^{14}$ is a cyclic group having a valence of (p+1) and selected from an alicyclic skeleton and a skeleton having an aromatic ring; and p is a positive integer including zero.

In this case however, some of carbon atoms on the alicyclic skeleton may be substituted by —(C=O)— or oxygen atom. When the hydrogen atoms on the ring are substituted by hydroxy group or alkoxy group, the resultant vinyl ether compounds would become preferable in terms of the dispersibility of pigment and the lowering of boiling point.

As for the specific examples of the cyclic group $R^{14}$ having a valence of (p+1), it is possible to employ, for example, groups having a valence of (p+1) such as benzene ring, naphthalene ring, biphenyl ring and anthracene ring; or groups having a valence of (p+1) from which cycloalkane skeleton, norbornane akeleton, adamantane skeleton, tricyclodecane skeleton, tetracyclododecane skeleton, terpenoid skeleton or cholesterol skeleton can be derived.

More specific examples of group $R^{14}$ include the compounds comprising alicyclic polyols such as cyclohexane (poly)ol, norbornane(poly)ol, tricyclodecane(poly)ol, adamantane(poly)ol, benzene(poly)ol, naphthalene(poly)ol, anthracene(poly)ol and biphenyl(poly)ol, wherein the hydrogen atom of the hydroxyl group thereof is substituted by vinyl group; and phenol derivatives, wherein the hydrogen atom of the hydroxyl group thereof is substituted by vinyl group. It is also possible to employ the compounds comprising a polyphenol compound such as polyvinylphenol or phenol novolac wherein the hydrogen atom of the hydroxyl group thereof is substituted by vinyl group. These compounds described above may be such that some of the hydroxyl groups thereof are left to remain or some of the methylene atoms of the alicyclic skeleton are substituted by ketone group or oxygen atom. Such a substitution of groups is preferable in view of reducing the volatility of the compounds.

In particular, since cyclohexyl monovinyl ether compound is high volatility, if this cyclohexyl monovinyl ether compound is to be employed, at least the cyclohexane ring should preferably be oxidized into cyclohexanone ring or modified so as to include hydroxyl group or alkoxy group. These vinyl ether compounds can be conveniently manufactured from hydroxy compounds employed as a raw material by using, for example, the synthesizing method reported in J. Am. Chem. Soc., vol. 124, No. 8, 1590-1591 (2002).

The alicyclic skeleton included in the various kinds of acid-polymerizable compounds should preferably be formed of a terpenoid skeleton. In this case, it would become possible to enhance the safety of inkjet ink or of the ink layer after the curing thereof to human body as well as to the environments. Examples of such an epoxy compound include epoxidized compounds to be obtained through the oxidation of unsaturated linkage of terpene-based compounds employed as a starting material, which can be derived from myrcene, ocimene, geraniol, nerol, linalol, citronenol, citral, menthene, limonene, dipentene, terpinolene, terpinene, phellandrene, sylvestrene, piperithol, terpineol, menthenemonol, isopregol, perary aldehyde, piperitone, dihydrocarvone, carvone, pinol, ascaridole, sabinene, carene, pimene, bornene, fenchene, camphene, carveol, sesquiterpene, diterpene, triperpene, etc. Alternatively, it is also possible to preferably employ alicyclic oxetane compounds wherein alcohols having the aforementioned skeleton is ether-linked, through dehydrocondensation, with the alcohols having an oxetane skeleton; as well as vinyl ether compounds wherein the hydrogen atom of alcohol having the aforementioned akeleton is substituted by vinyl group. On the other hand, epoxy compounds, oxetane compounds and vinyl ether compounds, all having a norbornene skeleton and abundantly available from natural environment, are advantageous in terms of cost and hence can be preferably employed. When the compounds having a terpenoid skeleton are incorporated at a ratio of 30% by weight or more, it would be possible to enable the compounds to sufficiently exhibit the effects thereof.

The oxidation for the epoxidization can be performed various oxidation methods such as a method wherein an oxidizing agent such as peracetic acid is employed. Especially, an air oxidation method where N-hydroxyphthalimide and a rare earth catalyst are employed would be most preferable for use in this case.

Since the inkjet ink according to the embodiments of the present invention is a photosensitive ink which requires the application of heating after the exposure thereof, the volatility of the ink should preferably be as low as possible in viewpoint of safety and odor. More specifically, the volatilization rate of ink at a temperature of 80° C. after the exposure thereof should preferably be confined to 0.2 mg/cm$^2$·min or less. The quantity of volatilization is indicated herein by a quantity of volatilization (mg) per minute under the condition where a vessel having an opening area of 10 cm$^2$ is heated for instance. Although this quantity of volatilization varies depending on the size of the opening of the vessel, this value is usually defined as a value that can be obtained when a Petri dish having a diameter of 6 cm and containing 4 g of ink therein is heated under the ordinary pressure. When the rate of volatilization of the ink exceeds the aforementioned range, the environmental safety would be deteriorated due to the excessively high volatilization rate of ink at the step of heating and at the same time, the problem of odor would become more severe. On the other hand, if the ink is formulated such that the volatility thereof is very poor, e.g. 0.00001 mg/cm$^2$·min or less, the viscosity of the ink would become too high in general so that there are much possibilities to make the delivery of inkjet difficult.

The inkjet ink according to the embodiments of the present invention should preferably be formulated so as to have a fluidity of at least 30 cP (=mpa·s) at the ordinary temperatures. In order to enable the ink to have the aforementioned properties, especially when the ink contains "n" kinds of acid-polymerizable compounds as described above, the viscosity $\eta_t$ represented by the following expression (1) should preferably be confined within the range of 3 (mPa·s) to 30 (mPa·s), more preferably 5 (mPa·s) to 25 (mPa·s). If the viscosity $\eta_t$ falls outside this range, it would become very difficult to enable the ink to discharge and the printed image would be more likely to be disturbed due to the turbulence of discharge of ink.

$$\eta_t = \exp(X_1 \cdot \ln(\eta_1) + X_2 \cdot \ln(\eta_2) + X_3 \cdot \ln(\eta_3) + \ldots + X_n \cdot \ln(\eta_n)) \quad (A)$$

(wherein $x_1, X_2, x_3 \ldots X_n$ represent weight ratios of each of the components; and $\eta_1, \eta_2, \eta_3 \ldots \eta_n$ represent the viscosity of the individual component at ordinary temperature and ordinary pressure)

The inkjet ink according to the embodiments of the present invention may be employed in such a manner that an ink layer formed on a recording medium is cured or pre-cured by subjecting the ink layer to irradiation of light and heating and then the resultant ink layer is further heated to completely cure to fix the ink layer onto a recording medium.

The liquid dispersion and inkjet ink according to the embodiments of the present invention should desirably be high in stability in inkjet delivery. However, the liquid dispersion as well as the inkjet ink are generally inclined to become higher in viscosity with time so that the preferable properties of them can be retained only a short period of time if they are left as they are. Therefore, it is desirable to incorporate, as a viscosity stabilizing agent, a basic compound and/or a compound capable of expressing basicity into the liquid dispersion and the inkjet ink. If carbon black is employed as a color component, the effects of these viscosity stabilizing agents can be exhibited more prominently. Moreover, since these basic compounds are concurrently capable of effectively protecting not only the interior of the inkjet head of recording apparatus but also the metal portions of the ink delivery piping from being eroded by acids, the employment of these basic compounds are preferable in any inkjet ink according to the embodiments of the present invention.

As for the aforementioned basic compounds, it is possible to employ any inorganic basic materials as well as organic basic materials which are capable of being dissolved in the aforementioned acid-polymerizable compounds. However, in view of solubility, the employment of organic basic materials is more preferable. Specific examples of such organic basic materials include ammonia compound, ammonium compounds, substituted or unsubstituted alkylamine, substituted or unsubstituted aromatic amine, pyridine, pyrimidine, and organic amines having a hetrocyclic skeleton such as imidazole. More specific examples of such organic basic materials include n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and 1,3-benzenedisulfonyl hydrazide.

Ammonium compounds can be also employed as a basic compound. Preferable examples of the ammonium compounds are quaternary ammonium salts. For example, methyl, ethyl, propyl, isopropyl, butyl, dodecyl, phenyl and benzyl can be employed as a substituent group for ammonium atom, and various anions such as hydroxyl ion, $^-$OR (R is alkyl having 1 to 4 carbon atoms), $^-$OCOR' (R' is alkyl, aryl or alkylaryl), OCOO$^-$ and OSOO$^-$ can be preferably employed as a counter ion. Especially preferable examples of the basic compound are tetramethyl ammonium hydroxide and ammonium salt of tetrabutyl hydroxide. These basic compounds can be employed singly or in combination of two or more.

However, if a basic compound which is very strong in basicity such as imidazole is employed in this case, polymerization with time may occur or otherwise, a side reaction such as decomposition of photo-acid generating agent may be likely to take place. On the other hand, if a basic compound which is very weak in basicity is employed in this case, it would become difficult to sufficiently secure the effect of stabilizing the viscosity of ink through the addition of the basic compound. Accordingly, it is preferable to employ basic compounds exhibiting a base dissociation constant pKb of 4 or more at a temperature of 25° C. and in a state of suitable aqueous solution thereof. However, if the pKb of the basic compounds is higher than 11, such compounds would be incapable of exhibiting the effect of stabilizing the viscosity of ink. Examples of basic compounds which are capable of satisfying the aforementioned conditions are pyridine derivatives, aniline derivatives, aminonaphthalene derivatives, other nitrogen-containing heterocyclic compounds and the derivatives thereof.

Specific examples of the pyridine derivatives include 2-fluoropyridine, 3-fluoropyridine, 2-chloropyridine, 3-chloropyridine, 3-phenylpyridine, 3-benzylpyridine, 2-formylpyridine, 2-(2'-pyridyl)pyridine, 3-acetylpyridine, 2-bromopyridine, 3-bromopyridine, 2-iodopyridine, 3-iodopyridine, and 2,6-di-tert-butylpyridine.

Specific examples of the aniline derivatives include aniline, 4-(p-aminobenzoyl)aniline, 4-benzylaniline, 4-chloro-N,N-dimethylaniline, 3-5-dibromoaniline, 2,4-dichloroaniline, N,N-dimethylaniline, N,N-dimethyl-3-nitroaniline, N-ethylaniline, 2-fluoroaniline, 3-fluoroaniline, 4-fluoroaniline, 2-iodoaniline, N-methylaniline, 4-methylthioaniline, 2-bromoaniline, 3-bromoaniline, 4-bromoaniline, 4-bromo-N,N-dimethylaniline, 2-chloroaniline, 3-chloroaniline, 4-chloroaniline, 3-chloro-N,N-dimethylaniniline, 3-nitroaniline, 4-nitroaniline, 2-methoxyaniline, 3-methoxyaniline, diphenylamine, 2-biphenylamine, o-toluidine, m-toluidine, p-toluidine, 3,3'-diaminodiphenyl sulfone, 4,4'-diaminodiphenyl sulfone, and 4,4'-bis(4-aminophenoxy)diphenyl sulfone.

Specific examples of the aminonaphthalene derivatives include, for example, 1-amino-6-hydroxynaphthalene, 1-naphthylamine, 2-naphthylamine, diethylaminonaphthalene, and N-methyl-1-naphthylamine.

Specific examples of other nitrogen-containing heterocyclic compounds and the derivatives thereof include, for example, cinnoline, 3-acetylpiperidine, pyrazine, 2-methylpyraxzine, methylaminopyrazine, pyridazine, 2-aminopyrimidine, 2-amino-4,6-dimethylpyrimidine, 2-amino-5-nitropyrimidine, 2,4,6-triamino-1,3,5-triazine, pyrrol, pyrazole, 1-methylpyrazole, 1,2,4-triazole, indazole, benzotriazole, quinazoline, quinoline, 3-aminoquinoline, 3-bromoquinoline, 8-carboxyquinoline, 3-hydroxyquinoline, 6-methoxyquinoline, 5-methylquinoline, quinoxaline, thiazole, 2-aminothiazole, 3,4-diazaindole, purine, 8-azapurine, indole and indolizine.

Among them, the employment of aniline derivatives as the aforementioned basic compound is especially preferable in terms of viscosity stability, volatility, basicity and low side-reaction.

However, since the aforementioned aniline compounds are relatively low basicity, the employment thereof in combination with an oxetane compound exhibiting basicity per se is not preferable in general. The oxetane compound should preferable be selected from those exhibiting such a high basicity that the pKb thereof at 25° C. is confined within the range of 3 to 7. For example, basic compounds such as amine having an aliphatic skeleton or amine having an alicyclic skeleton can be suitably employed.

When the aforementioned basic compounds are capable of forming a salt with an anion as represented by the following general formula (10) and if the acidity of the anion is relatively low, the basic compounds will be enabled to exhibit a weak basicity, thereby making it possible to employ such basic compounds likewise.

(10)

wherein $A^-$ is a compound having a sulfonate anion or a carboxyl anion; and $R^{21}$, $R^{22}$, $R^{23}$ and $R^{24}$ may be the same or different and are individually a substituted or unsubstituted aromatic group, hydrogen atom, hydroxyl group, or a substituted or unsubstituted alkyl group.

Since the main ink may be sometimes heated subsequent to the exposure thereof, these basic compounds should preferably be as low in volatility as possible. More specifically, the boiling point of these basic compounds should preferably be 150° C. or more, more preferably 180° C. or more.

The mixing ratio of the basic compounds or of the compounds capable of expressing basicity should preferably be confined within the range of 1 mol % to 30 mol %, more preferably 2 mol % to 15 mol % based on a total molar quantity of the photo-acid generating agent. If the mixing ratio of the basic compound or of the compound capable of expressing basicity falls outside this range, the sensitivity of the ink would be remarkably degraded or otherwise the effect of stabilizing the viscosity of the ink would be lost.

The employment of a photo-sensitive basic compound that can be decomposed by the irradiation of light or radiation would be preferable, since the deterioration of sensitivity due to the addition of a basic material can be minimized.

As for the photo-sensitive basic compound, it is possible to preferably employ sulfonium compounds and iodonium compounds. As for the sulfonium compounds, the compounds represented by the following general formulas (SS1) to (SS4) can be exemplified.

(SS1)

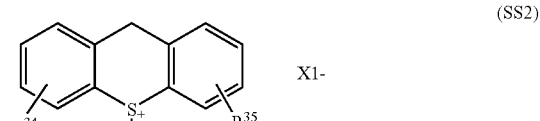

(SS2)

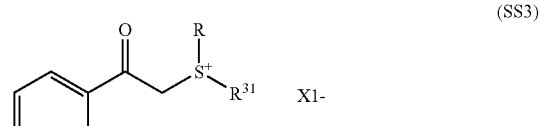

(SS3)

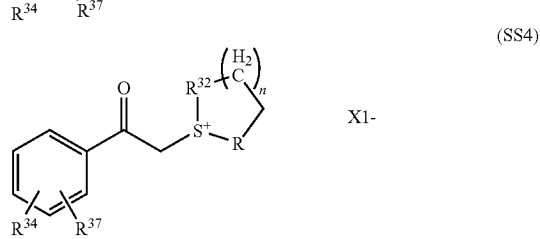

(SS4)

wherein $R^{31}$, $R^{32}$ and $R^{33}$ may be the same or different and are individually alkyl group, aryl group, heteroaryl group, heteroalkyl group, alkylaryl group, halogen atom, alkoxy group, phenoxy group, thiophenol group, phenylsulfonyl-substituted aryl group or phenylsulfenyl-substituted aryl group; Y is $CH_2$, O or S; $R^{34}$, $R^{35}$, $R^{36}$ and $R^{37}$ may be the same or different and are individually alkyl group, alkoxy group or halogen atom; and $X1^-$ represents a basic anion.

Preferable examples of $R^{31}$, $R^{32}$ and $R^{33}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{34}$, $R^{35}$, $R^{36}$ and $R^{37}$ include alkyl group, methoxy group, ethoxy group, chlorine atom and bromine atom.

Specific examples of X1⁻ include anions such as hydroxyl ion, ⁻OR (R is alkyl having 1 to 4 carbon atoms), ⁻OCOR'(R' is alkyl, aryl or alkylaryl), OCOO⁻ and OSOO⁻.

As for the iodonium compounds, the compounds represented by the following general formulas (IS1) to (IS3) can be exemplified.

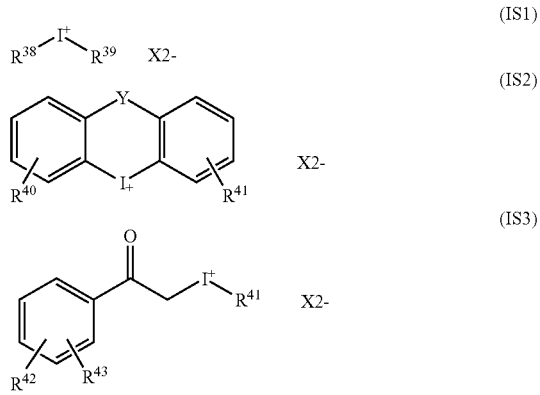

wherein $R^{38}$ and $R^{39}$ may be the same or different and are individually alkyl group, aryl group, heteroaryl group, heteroalkyl group, alkylaryl group, halogen atom, alkoxy group, phenoxy group, thiophenol group, phenylsulfonyl-mono, di or tri-substituted aryl group or phenylsulfenyl-mono, di or tri-substituted aryl group; Y is $CH_2$, O or S; $R^{40}$, $R^{41}$, $R^{42}$ and $R^{43}$ may be the same or different and are individually alkyl group, alkoxy group or halogen atom; n is an integer of 5 or 6; and X2⁻ represents a basic anion.

Preferable examples of $R^{38}$ and $R^{39}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{40}$, $R^{41}$, $R^{42}$ and $R^{43}$ include alkyl group, methoxy group, ethoxy group, chlorine atom and bromine atom.

Specific examples of X2⁻ include anions such as hydroxyl ion, ⁻OR (R is alkyl having 1 to 4 carbon atoms), ⁻OCOR' (R' is alkyl, aryl or alkylaryl), OCOO⁻ and OSOO⁻.

Especially preferable examples of such sulfonium compounds and iodonium compounds are triphenylsulfonium acetate, triphenyl sulfonium hydroxide, triphenyl sulfonium phenolate, tris-(4-methylphenyl)sulfonium hydroxide, tris-(4-methylphenyl)sulfonium acetate, tris-(4-methylphenyl) sulfonium phenolate, diphenyl iodonium hydroxide, diphenyl iodonium acetate, diphenyl iodonium phenolate, bis-(4-t-butylphenyl)iodonium hydroxide, bis-(4-t-butylphenyl) iodonium acetate, bis-(4-t-butylphenyl)iodonium phenolate, thiophenyl-substituted triphenylsulfonium acetate, and thiophenyl-substituted triphenylsulfonium hydroxide.

In addition to the aforementioned basic compounds, it is also possible to incorporate other basic compounds into the ink. Further, in order to obtain excellent results in terms of photosensitivity and shelf life stability, the photo-acid generating agent should preferably be selected from those which are similar in kinds to the basic compound. For example, the photo-acid generating agent and the basic compound should preferably be both formed of sulfonium compounds or iodonium compounds.

Alternatively, it is also possible to preferably employ a compound which is not inherently basic but is capable of generating a basic compound through the decomposition thereof with time, since the basic compound thus generated can act to neutralize the acids generating gradually. Specific examples of such a compound include compounds which are capable of generating a basic compound as they are heated, such as NBC-101 (trade name; Midori Kagaku Co., Ltd.), and carbamate compounds such as α, α-dimethyl-3,5-dimethoxybenzyl carbamate.

The inkjet ink according to the embodiments of the present invention may further comprise, for further enhancing the dispersibility of pigment, etc., a small quantity of dispersing agents such as a nonionic or ionic surfactant and an antistatic agent. Polymer dispersing agents having almost the same properties as the aforementioned dispersing agents, such as acrylic polymer and polyvinyl alcohol, can be also suitably employed. However, when a cationic dispersing agent is employed as a dispersing agent, it is preferable to select a compound whose acidity is lower than that of carboxylic acid. The reason is that some cationic dispersing agents may promote the curing dark reaction of the ink. Further, certain dispersing agents and dyes that exhibit strong basicity are also undesirable as they not only deteriorate the sensitivity of ink but also promote the curing dark reaction occasionally. Therefore, the dispersing agents should preferably be selected from those exhibiting nearly neutrality or from nonionic dispersing agents.

When a printing surface is highly basic, or when a pigment or a printing surface is liable to be affected by an acid, the influence of the acid can be minimized by the incorporation of a suitable radically polymerizable compound into the inkjet ink according to the embodiments of the present invention. As for the examples of such a radically polymerizable compound, they include, for example, an acrylic monomer, a methacrylic monomer, a styrene monomer, and a compound having a plurality of vinyl-based polymerizable groups of these monomers. When a vinyl ether compound is included in the inkjet ink, it can be employed in combination with an acrylic monomer or may radically polymerize singly. Likewise, when a compound provided with radically polymerizable properties and cationically polymerizable properties, such as CEL2000 (trademark, DAICEL Chemical Industries., Ltd.), glycidyl methacrylate, and ester compounds formed from vinyl alcohols and acrylic or methacrylic acid, etc. is incorporated into the ink, it would be possible to obtain advantages associated with both radical polymerizability and cationic polymerizability. In this case, a photoradical polymerization initiator such as Michler's ketone known as Irgar Cure (trade mark) and benzophenone can be incorporated into the ink together with a photocrosslinking type radical generating agent such as bisazide. This technique may be employed also in a case where the ink layer is required to have excellent chemical resistance after the curing thereof.

In the preparation of the inkjet ink according to the embodiments of the present invention, it is generally desired that volatile components such as water and organic solvents that may be included in the inkjet ink are as minimum as possible. However, organic solvents to be used in the preparation of raw materials such as methylethyl ketone, propylene glycol-based solvents and ethyl lactate may enter into the inkjet ink if the quantity thereof is limited to an unavoidable degree. Further, if a gas exhausting mechanism or a solvent recovery mechanism is provided, for instance, a little quantity of organic solvents may be contained in the ink for the purpose of obtaining desired printed matters. In this case, it is preferable, in safety viewpoint, to employ water, alcohols such as ethanol and propanol, or petroleum components such as isoper and terpene.

As already explained above, in the inkjet ink according to the embodiments of the present invention, the image-forming capability thereof depends largely on the chemically amplified mechanism. Namely, an acid generates from a photo-acid generating agent due to the exposure thereof, and the acid thus generated is diffused due to the heating thereof, thus enabling the acid to function as a catalyst for the crosslinking reaction or decomposition reaction. Therefore, in the case of this inkjet ink, the presence of basic ions in a great magnitude would cause the deterioration of the sensitivity of the ink. Therefore, attention should be paid so that the inkjet ink can be prevented from being contaminated by a large quantity of basic ions not only in the process of preparing the inkjet ink but also even in the process of manufacturing each of the constituent components.

Next, the method of inkjet recording according one embodiment of the present invention will be explained with reference to drawing.

FIGURE is a schematic view of a typical inkjet recording apparatus employed for performing the inkjet recording by the method according to one embodiment of the present invention. The inkjet recording apparatus 1 shown in FIGURE is provided with a transferring mechanism 3 for transferring a recording medium 2. Along the running direction of the transferring mechanism 3, there are successively disposed, starting from the upstream side to the downstream side, an inkjet type recording head 4, a light source 5 and a heater as a heating mechanism 6.

With respect to the recording medium (or an article to which printing is applied) 2, there is not any particular limitation on the kinds thereof as long as printing can be performed on the recording medium 2. Namely, it is possible to employ, as the recording medium 2, various materials including paper, an OHP sheet, a resin film, non-woven fabric, a porous film, a plastic plate, a circuit board and a metallic substrate.

The transferring mechanism 3 is constructed so as to enable the recording medium 2 to pass successively through the recording head 4, the light source 5 and the front side of heater 6. In this case, the transferring mechanism 3 transfers the recording medium 2 from the right side to the left side in the drawing. This transferring mechanism 3 can be constituted for example by a belt and/or a roller for transferring the recording medium 2, and a driving mechanism for driving the belt and/or the roller. Further, this transferring mechanism 3 may be further provided with a guiding member for assisting the transfer of the recording medium 2.

The recording head 4 is provided so as to deliver an inkjet ink onto the recording medium 2 according to image signals, thereby forming an ink layer. As for the recording head 4, it is possible to employ a serial scanning type head mounted on a carriage or a line scanning type head having a width larger than that of the recording medium 2. In viewpoint of achieving a high-speed printing, the latter head is generally more advantageous as compared with the former head. With respect to the method of delivering an inkjet ink from the recording head 4, there is not any particular limitation. For example, by using the pressure of vapor to be generated by the heat of a heating element, the droplets of ink can be ejected. Alternatively, by using a mechanical pressure pulse to be generated from a piezoelectric element, the droplets of ink can be ejected.

The light source 5 irradiates light to the ink layer formed on the recording medium 2, thus enabling acid to generate in the ink layer. As for the light source 5, it is possible to employ a mercury lamp such as a low, medium or high pressure mercury lamp; a tungsten lamp; an arc lamp; an excimer lamp; an excimer laser, a semiconductor laser; a YAG laser; a laser system constituted by a combination of laser and non-linear optical crystal; a high-frequency induction ultraviolets generating apparatus; an electron beam irradiating apparatus; an X-ray irradiating apparatus; etc. Among them, the employment of the high-frequency induction ultraviolets generating apparatus, the high/low pressure mercury lamp and the semiconductor laser would be more preferable, since these devices are advantageous in simplifying the system involved. The light source 5 may be provided with a converging mirror or a sweep optical system.

The heater 6 employed as a heating mechanism heats the ink layer formed on the recording medium 2, thus promoting the crosslinking reaction using an acid as a catalyst. As for this heater 6, it is possible to employ an infrared lamp; a roller housing therein a heating element (heat roller); a blower for ejecting hot air or heated air; etc.

By using the aforementioned apparatus 1, the printing to the recording medium can be performed by the following method.

First of all, by the transferring mechanism 3, the recording medium 2 is transferred from the right side to the left side in the drawing. The transferring speed of the recording medium 2 may be confined for example within the range of 0.1 m/min to 100 m/min.

As the recording medium 2 is transferred up to a location in front of the recording head 4, the aforementioned inkjet ink is delivered from the recording head 4 according to the image signals. As a result, a prescribed ink layer (not shown) is formed on the recording medium 2.

Then, the recording medium 2 having the ink layer formed thereon is transferred to a location in front of the light source 5. At the moment when the recording medium 2 passes through a location in front of the light source 5, light is irradiated from the light source 5 to the ink layer formed on the recording medium 2, thereby enabling an acid to generate in the ink layer. Incidentally, the intensity of irradiated beam at the surface of ink layer may be confined generally within the range of several $mW/cm^2$ to 1 $KW/cm^2$ though this range may be varied depending on the wavelength of the light source to be employed. The quantity of exposure to the ink layer can be optionally determined depending on the sensitivity of inkjet ink or on the transferring speed of the printing matter (i.e. the transferring speed of the recording medium 2).

Thereafter, the recording medium 2 is transferred to the interior of or in the vicinity of the heater 6. At the moment when the recording medium 2 passes through the interior of or in the vicinity of the heater 6, the ink layer formed on the recording medium 2 is heated by the heater 6 to promote the crosslinking reaction in the ink layer. Incidentally, in the apparatus shown in FIGURE, the heating time by the heater 6 is generally relatively short, i.e. ranging from several seconds to several tens seconds. Accordingly, if it is desired that the curing of the ink layer is substantially completely accomplished by the heater 6, the heating should be performed with the maximum ultimate temperature being controlled to become relatively high, i.e. about 200° C. or less, more preferably within the range of 80° C. to 200° C., most preferably within the range of about 60° C. to 180° C.

Subsequently, the recording medium 2 is transferred to the interior of stocker (or vessel) (not shown), thus finishing the printing.

The heating mechanism for heating the ink layer may not be restricted to the heater 6 which is disposed at a downstream side of the light source as shown in the drawing. For example, the light source 5 may be utilized as a heating source by moving the light source 5 close to recording medium 2 on the occasion of irradiating light to the ink layer while taking care so as not to damage the printing surface. Likewise, it is also possible to utilize the light source as a heating source by omitting the provision of a heat-dissipating mechanism such as a cold mirror. When a high-output bulb of several hundreds watts is employed as a light source, a cooling mechanism provided together with the light source can be modified so as to intentionally return the waste heat to printing paper. More specifically, part of the waste heat mechanism of the cooling mechanism is modified so as to provide a mechanism which makes it possible to return the waste heat to the printing paper as described above. By providing such a mechanism, the ink layer can be heated by using heat to be generated from the light source.

For example, it is possible to provide a light source having an output of not less than one hundred watts and provided with a mechanism which is capable of re-introducing an air flow which has been once utilized for cooling the light source onto the printing paper or into the interior of transferring/sustaining mechanism so as to utilize the air flow for heating the ink layer. The ultimate temperature of the recording medium that can be realized through the recirculation of heat of the light source may be such that makes it possible to obtain the same degree of effect as obtainable from the heating by the aforementioned heater. Although it depends on the heating time, a preferable range of temperature may be generally at least 60° C. or more, more preferably within the range of 80° C. to 100° C. When the speed of exposure is relatively high, e.g. several meters/sec., the ultimate temperature may be as high as 180° C. so as to instantaneously heat the recording medium.

When a light source which is capable of generating infrared ray in addition to the visible light is employed as the light source 5 for instance, the irradiation of light and the heating to the recording medium can be concurrently performed. The employment of such a light source is preferable since it will promote the curing of ink layer.

Since the ink layer is heated also from the heat to be generated from the light source 5 as the ink layer is irradiated with light, the heating mechanism may not necessarily be installed as an independent member as in the case of the heater 6. However, if only the heat from the light source 5 is utilized for heating the ink layer and then the heated ink layer is left to stand at the ordinary temperature for completely curing the ink layer, it will take a long time. Therefore, the standing of ink layer at the ordinary temperature should preferably be applied to only on the occasions where sufficiently a long period of time can be secured for complete curing of the ink layer. For example, in the case of the printed matters such as newspaper which will be distributed next day, it is possible to secure such a long time as about a whole day and night for allowing the ink layer to cure, and therefore it is possible to completely cure the ink layer even if the ink layer is left to stand at the ordinary temperature.

The images to be obtained by using the aforementioned recording method and ink would be excellent not only in quality of printing but also in curing property, thus making them excellent in four respects, i.e. hardness, adhesion, sunproof and safety. Namely, in addition to the inhibition of emission of poisonous materials from the printed images after the curing thereof, the reduction of weight of the ink during the exposure thereof can be restricted to within 10%, thus making it possible to desirably minimize the scattering matters in the atmosphere of printing.

Next, specific embodiments of the present invention will be explained in detail by referring to the following specific examples.

EXAMPLE I

First of all, by using the compounds represented by the following chemical formulas (C1), (C2), (C3) and (C4) as an acid-polymerizable compound (solvent), various pigment dispersion compositions were prepared according to the formulations shown in the following Table 1.

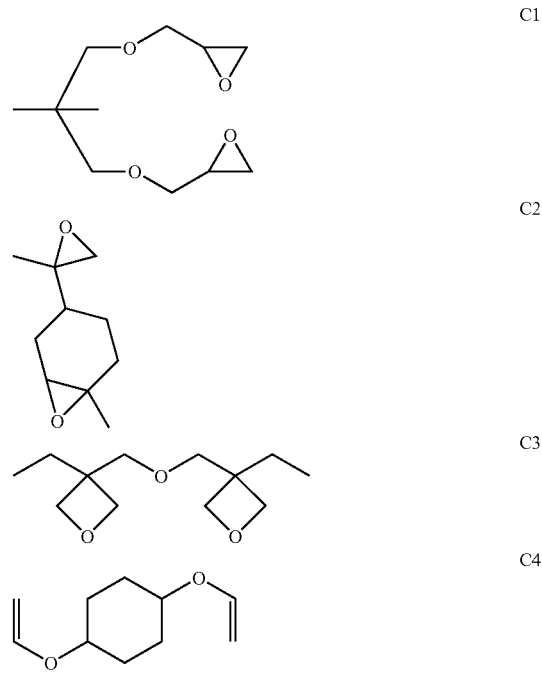

TABLE 1

| Dispersion | Solvent | Pigment | Synergist (wt %) | Dispersing agent (wt %) |
|---|---|---|---|---|
| C1(Bk) | C1 | PB7 | A(0.22) | 3.42 |
| C1(Y) |  | PY180 | B(0.31) | 3.42 |
| C1(C) |  | PB15:3 | A(0.31) | 3.43 |
| C1(M) |  | PV19 |  | 5 |
| C2(Y) | C2 | PY180 | B(0.31) | 3.42 |
| C2(C) |  | PB15:3 | A(0.31) | 3.43 |
| C2(M) |  | PV19 |  | 5 |
| C3(Y) | C3 | PY180 | B(0.31) | 3.42 |
| C3(C) |  | PB15:3 | A(0.31) | 3.43 |
| C3(M) |  | PV19 |  | 5 |
| C4(Y) | C4 | PY180 | B(0.31) | 3.42 |
| C4(C) |  | PB15:3 | A(0.31) | 3.43 |
| C4(M) |  | PV19 |  | 5 |

Incidentally, Pigment Black 7 (PB7), C.I. Pigment Yellow 180 (PY180), C.I. Pigment Blue 15:3 (PB13:3) and C.I. Pigment Violet 19 (PV19) were employed as a black pigment, a yellow pigment, a cyan pigment and magenta pigment, respectively, each at a concentration of 10% by weight based on the entire weight of the solvent.

As synergistic additives, two kinds of compounds, i.e. a compound (A) consisting of phthalocyanine blue having sulfonic group and a compound (B) consisting of benzimidazolone having sulfonic group were prepared and incorporated into the ink as required. The mixing ratios in Table 1 denote weight % based on the entire weight of the solvent.

By following each of the formulations, pigments and synergistic additives were incorporated into the acid-polymerizable compounds and then, as a dispersing agent, polyester resin having a terminal group having a butylamino (pKb=4.22) structure was further incorporated into the acid-polymerizable compounds to obtain a mixture which was then stirred. Subsequently, by using a horizontal dispersion mill filled with zirconia beads 0.1 mm in diameter at a concentration of 80%, the mixture was subjected to circulatory dispersion for 30 minutes at a peripheral velocity of 8 m/sec to obtain various dispersion compositions as shown in Table 1, i.e. C1(Bk) through C4(M) where pigments adsorbing a resin having a basic terminal were dispersed in the acid-polymerizable compounds, respectively.

To 25% by weight of each of the dispersion compositions, predetermined components such as acid-polymerizable compounds and photo-acid generating agents were mixed together at a formulation as shown in the following Table 2 to prepare various inkjet inks. As for the photo-acid generating agents, the compounds represented respectively by the following structural formulas (PAG1) and (PAG2) were dissolved in propylene carbonate, thereby forming a 50 wt % solution thereof. Accordingly, the mixing ratios of the photo-acid generating agents in Table 2 represent net weight % and hence the same quantity of propylene carbonate was included in the ink. Incidentally, PAG1 denotes a polyvalent photo-acid generating agent and PAG2 denotes a monovalent photo-acid generating agent. For the purpose of comparison, compounds where $SbF_6^-$, $AsF_6^-$, $CF_3SO_3^-$ and paratoluene sulfonic anion were respectively substituted for the hexafluorophosphate anion of PAG2 were also employed.

Further, methylsulfonic compound NIP1 (NAI-100; Midori Kagaku Co., Ltd.) representing a nonionic photo-acid generating agent was also incorporated, as required, into the ink. Furthermore, PI1(dibutoxy anthracene) was also added as a sensitizing agent, at a ratio of 20% by weight based on the quantity of photo-acid generating agent, to all of the inkjet inks except the inks of No. 19 and No. 20.

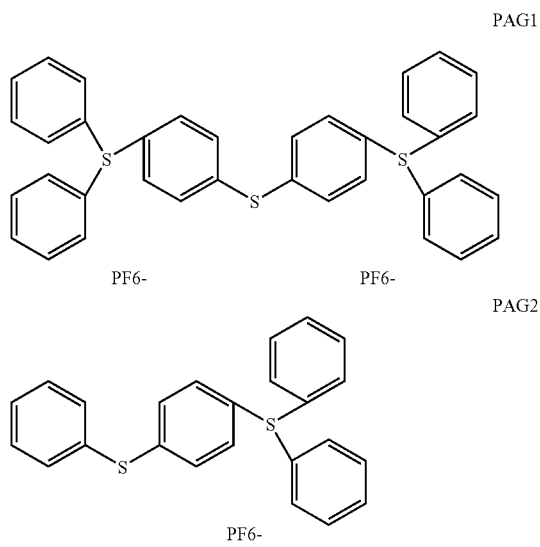

TABLE 2

| Ink No. | Dispersion | Acid-polymerizable compounds (wt %) 1 | 2 | Photo-acid generating agent (wt % based on solvent) |
|---|---|---|---|---|
| 1 | C1(Bk) | C1(25) | C2(50) | PAG2(3%) |
| 2 | C1(Y) | C1(25) | C2(50) | PAG2(3%) |
| 3 | C1(C) | C1(25) | C2(50) | PAG2(3%) |
| 4 | C1(M) | C1(25) | C2(50) | PAG2(3%) |
| 5 | C2(Y) | C2(25) | C3(50) | PAG2(3%) |
| 6 | C2(C) | C2(25) | C3(50) | PAG2(3%) |
| 7 | C2(M) | C2(25) | C3(50) | PAG2(3%) |
| 8 | C3(Y) | C3(25) | C1(50) | PAG2(3%) |
| 9 | C3(C) | C3(25) | C1(50) | PAG2(3%) |
| 10 | C3(M) | C3(25) | C1(50) | PAG2(3%) |
| 11 | C4(Y) | C4(75) | — | PAG2(3%) |
| 12 | C4(C) | C4(75) | — | PAG2(3%) |
| 13 | C4(M) | C4(75) | — | PAG2(3%) |
| 14 | C1(M) | C1(25) | C2(50) | PAG2(2.7%) + PAG1(0.3%) |
| 15 | C1(M) | C1(25) | C2(50) | PAG2(2.4%) + PAG1(0.6%) |
| 16 | C1(M) | C1(25) | C2(50) | PAG2(2.1%) + PAG1(0.9%) |
| 17 | C3(C) | C1(25) | C2(50) | PAG2(2.1%) + PAG1(0.9%) |
| 18 | C1(M) | C1(25) | C2(50) | PAG2(3%) + NIP1(5%) |
| 19 | C1(M) | C1(25) | C2(50) | PAG2(4%) |
| 20 | C1(M) | C1(25) | C2(50) | PAG2(5%) |
| 21 | C1(M) | C1(25) | C2(50) | $SbF_6^-$salt(3%) |
| 22 | C1(M) | C1(25) | C2(50) | $AsF_6^-$salt(3%) |
| 23 | C1(M) | C1(25) | C2(50) | $CF_3SO_3^-$salt(3%) |
| 24 | C1(M) | C1(25) | C2(50) | Paratoluene sulfonate (3%) |

In the preparation of the inkjet inks, mixtures comprising all of the components were respectively stirred for 30 minutes by a rotor. Further, the resultant mixtures were filtered using a 5 μm-mesh PTFE filter to obtain the inkjet inks of Nos. 1-24. Among these inkjet inks, the inkjet inks of Nos. 19 and 20 represent respectively a comparative example because of an excessive quantity of the photo-acid generating agent included therein, and the inkjet inks of Nos. 21-24 represent respectively a comparative example because of nonexistence of fluorophosphate salt. Further, the inkjet inks of Nos. 16 and 17 represent respectively a comparative example because of the fact that the content of the polyvalent photo-acid generating agent included therein was more than 20% by weight.

All of the inkjet inks were respectively kept standing for three months at ordinary temperature and then, the average particle diameter of the pigment particles was measured. The results thus obtained are summarized together with the initial particle diameter of the pigment particles in the following Table 3. Incidentally, the average particle diameter of the pigment particles was determined by using an HPPS dynamic light-scattering type particle size analyzer (Malvern Co., Ltd.). As long as the increase of average particle diameter of the pigment particles in the inkjet ink is limited to not more than 30% or so, the inkjet ink can be considered acceptable.

TABLE 3

| Ink No. | Average particle diameter (nm) Initial | After 3 months |
|---|---|---|
| 1 | 112 | 121 |
| 2 | 150 | 169 |
| 3 | 120 | 139 |
| 4 | 145 | 160 |
| 5 | 145 | 157 |
| 6 | 120 | 141 |

TABLE 3-continued

| Ink No. | Average particle diameter (nm) | |
|---|---|---|
| | Initial | After 3 months |
| 7 | 139 | 161 |
| 8 | 145 | 159 |
| 9 | 122 | 145 |
| 10 | 142 | 168 |
| 11 | 151 | 167 |
| 12 | 125 | 140 |
| 13 | 147 | 166 |
| 14 | 143 | 166 |
| 15 | 145 | 186 |
| 16 | 149 | 356 |
| 17 | 119 | 368 |
| 18 | 145 | 152 |
| 19 | 151 | 252 |
| 20 | 155 | 359 |
| 21 | 142 | 668 |
| 22 | 147 | 756 |
| 23 | 182 | 255 |
| 24 | 143 | 221 |

As shown in Table 3, in the cases of the inkjet inks of Nos. 1-24 where color pigments and onium salts other than hexafluorophosphate were employed and in the cases of the inkjet inks of Nos. 16 and 17 where an excessive quantity of polyvalent photo-acid generating agent was employed, the increase of the average particle diameter of pigment particles was found more prominent. In the cases of the inkjet inks of Nos. 19 and 20 where a relatively large quantity of photo-acid generating agent was employed on account of the nonexistence of the sensitizing agent and nonionic photo-acid generating agent, the fluctuation of the pigment particle size was found very prominent and hence poor in dispersion stability.

Whereas, in the cases of the inkjet inks of Nos. 1-15 and No. 18 where hexafluorophosphate and polyvalent photo-acid generating agent were employed with the content of the polyvalent photo-acid generating agent being limited to 20% by weight or less based on the entire quantity of photo-acid generating agents and the total content of the entire photo-acid generating agents being limited to less than 4% based on the ink, the fluctuation of the pigment particle size was found small as seen from Table 3.

Next, a discharge test was performed on each of the inkjet inks. More specifically, by using the inkjet recording apparatus 1 shown in the drawing, the inkjet inks were respectively discharged onto the paper while successively feeding the paper to execute the printing and the frequency of printing error (missing of printing and non-uniform discharging of ink) generated was measured.

In this discharge test, ordinary continuous enameled paper was employed as the recording medium 2 and an ultra-high pressure mercury lamp having an output of 500 W was employed as the light source 5. The exposure dosage was constantly set to 1000 mJ/cm$^2$ and the temperature of the discharging head was maintained at a temperature of 45° C. The heating step was continued for two seconds at a temperature of 100° C. The frequency of error per hour is summarized in the following Table 4. It is desirable that the frequency of error per hour should be limited to 5 or less.

TABLE 4

| Ink No. | Frequency of error | Remarks |
|---|---|---|
| 1 | 0.5 | |
| 2 | 0.2 | |
| 3 | 0.7 | |
| 4 | 1.0 | |
| 5 | 0.2 | |
| 6 | 0.5 | |
| 7 | 1.1 | |
| 8 | 0.3 | |
| 9 | 0.8 | |
| 10 | 1.1 | |
| 11 | 0.3 | |
| 12 | 0.5 | |
| 13 | 1.0 | |
| 14 | 1.2 | |
| 15 | 4.5 | |
| 16 | 125 | Fails to discharge at sometime later |
| 17 | 36 | |
| 18 | 1.1 | |
| 19 | 11 | |
| 20 | 258 | Fails to discharge at sometime later |
| 21 | 375 | Fails to discharge at sometime later |
| 22 | 278 | Fails to discharge at sometime later |
| 23 | 27 | |
| 24 | 32 | |

As shown in Table 4, the inkjet inks where onium salts other than hexafluorophosphate and polyvalent photo-acid generating agents were employed as well as the inkjet inks where an excessive quantity of photo-acid generating agent was employed were accompanied with the problem of a high frequency of error.

Whereas, in the cases of the inkjet inks where hexafluorophosphate and a large content of monovalent photo-acid generating agent were employed as well as the inkjet inks where only the monovalent photo-acid generating agent was employed, the frequency of error was found very small.

EXAMPLE II

To 25% by weight of the dispersion composition obtained in Example 1, predetermined components including various acid-polymerizable compounds and photo-acid generating agents were mixed together at a formulation as shown in the following Table 5 to prepare various inkjet inks. As for the photo-acid generating agents, the compounds represented respectively by the following structural formulas (PAG3), (PAG4), (PAG5) and (PAG6) were dissolved in propylene carbonate, thereby forming a 50 wt % solution thereof. Accordingly, the mixing ratios of the photo-acid generating agents in Table 5 represent net weight % and hence the same quantity of propylene carbonate was included in the ink. Incidentally, all of PAG3, PAG4, PAG5 and PAG6 were compounds each having a substituent group.

Further, PI1(dibutoxy anthracene) was also added as a sensitizing agent, at a ratio of 20% by weight based on the quantity of photo-acid generating agent, to all of the inkjet inks.

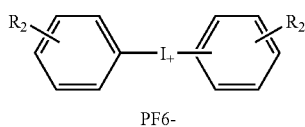

PAG3 wherein R₂ is alkyl group having 8 to 14 carbon atoms (a mixture).

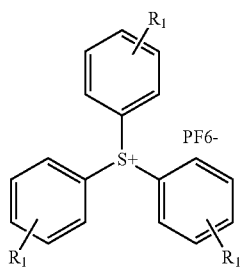

PAG4 wherein R1 is $OC_4H_{10}$.

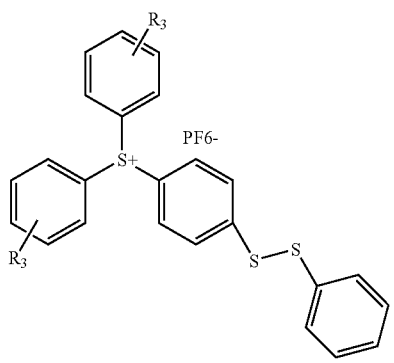

PAG5 wherein $R_3$ is $C_6H_{13}$.

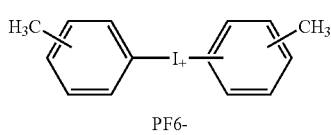

PAG6

TABLE 5

| Ink No. | Dispersion | Acid-polymerizable compounds (wt %) | | Photo-acid generating agent (wt % based on solvent) |
|---|---|---|---|---|
| | | 1 | 2 | |
| 25 | C1(Bk) | C1(25) | C2(50) | PAG3(3%) |
| 26 | C1(Y) | C1(25) | C2(50) | PAG3(3%) |
| 27 | C1(C) | C1(25) | C2(50) | PAG3(3%) |
| 28 | C1(M) | C1(25) | C2(50) | PAG3(3%) |

TABLE 5-continued

| Ink No. | Dispersion | Acid-polymerizable compounds (wt %) | | Photo-acid generating agent (wt % based on solvent) |
|---|---|---|---|---|
| | | 1 | 2 | |
| 29 | C2(Y) | C2(25) | C3(50) | PAG4(3%) |
| 30 | C2(C) | C2(25) | C3(50) | PAG4(3%) |
| 31 | C2(M) | C2(25) | C3(50) | PAG4(3%) |
| 32 | C3(Y) | C3(25) | C1(50) | PAG5(3%) |
| 33 | C3(C) | C3(25) | C1(50) | PAG5(3%) |
| 34 | C3(M) | C3(25) | C1(50) | PAG5(3%) |
| 35 | C4(Y) | C4(75) | — | PAG6(3%) |
| 36 | C4(C) | C4(75) | — | PAG6(3%) |
| 37 | C4(M) | C4(75) | — | PAG6(3%) |

In the preparation of the inkjet inks, at first, mixtures comprising all of the components were respectively stirred for 30 minutes by a rotor. Further, the resultant mixtures were filtered using a 5 µm-mesh PTFE filter to obtain the inkjet inks of Nos. 25-37. These inkjet inks were formed of the same compositions as those of Nos. 1-13 of Example I except that the photo-acid generating agent were changed.

All of the inkjet inks were respectively kept standing for three months at ordinary temperature and then, the average particle diameter of the pigment particles was measured. The results thus obtained are summarized together with the initial particle diameter of the pigment particles in the following Table 6.

TABLE 6

| Ink No. | Average particle diameter (nm) | |
|---|---|---|
| | Initial | After 3 months |
| 25 | 102 | 112 |
| 26 | 142 | 152 |
| 27 | 115 | 125 |
| 28 | 137 | 144 |
| 29 | 141 | 150 |
| 30 | 116 | 130 |
| 31 | 129 | 142 |
| 32 | 137 | 145 |
| 33 | 120 | 132 |
| 34 | 139 | 148 |
| 35 | 142 | 162 |
| 36 | 122 | 139 |
| 37 | 146 | 160 |

It will be recognized from the comparison between the results of Table 3 and the results of Table 6 that the inks (Nos. 25-37) where a photo-acid generating agent having a substituent group was employed were found minimal in fluctuation of the pigment particle size.

Then, a discharge test was performed on each of the inkjet inks under the same conditions as those of the aforementioned Example I to measure the frequency of printing error (missing of printing and non-uniform discharging of ink) generated in the test. The frequency of error per hour thus obtained is summarized in the following Table 7.

Further, a sample of gas was taken out of the interior of the printing machine to investigate the quantity generated of poisonous benzene by gas chromatography, the results being summarized also in the following Table 7. In Table 7, inks Nos. 38 and 39 are inks of comparative examples. More specifically, the ink composition of No. 38 was the same as that of example 4 and the ink composition of No. 39 was the same as that of example 21.

TABLE 7

| Ink No. | Frequency of error | Remarks | Conc. of benzene (ppm) |
|---|---|---|---|
| 25 | 0.4 | | Not detected |
| 26 | 0.2 | | Not detected |
| 27 | 0.4 | | Not detected |
| 28 | 0.2 | | Not detected |
| 29 | 0.1 | | Not detected |
| 30 | 0.2 | | Not detected |
| 31 | 0.3 | | Not detected |
| 32 | 0.1 | | Not detected |
| 33 | 0.3 | | Not detected |
| 34 | 0.3 | | Not detected |
| 35 | 0.3 | | 0.2 |
| 36 | 0.4 | | 0.5 |
| 37 | 1.1 | | 0.7 |
| 38 | — | — | 5 |
| 39 | — | — | 12 |

It will be recognized from the results of Table 7 that the inkjet inks (Nos. 25-37) where photo-acid generating agents each having a substituent group having at least one carbon atom, in particular, the inkjet inks (Nos. 25-34) where photo-acid generating agents each having a substituent group having four or more carbon atoms were employed, it was possible to reduce the frequency of printing error. Moreover, the generation of poisonous benzene was also scarcely observed in these inkjet inks. When the reduction in weight of the ink after the exposure thereof in comparison with the weight of the ink before the exposure and immediately after the printing was measured on the printed images that had been formed using the inks of comparative examples (Nos. 38 and 39), a reduction in weight of about 10% was admitted, thus indicating the generation of a large quantity of scattered matters other than benzene during the exposure. Whereas, in the cases of the inks of Nos. 25-37, the reduction in weight of the inks was nearly 0 to 5% at most, confirming the fact that the printed matters obtained was minimal in quantity of scattered matters generated in the interior of the printing machine.

Furthermore, these continuous printed matters were cut out after the curing thereof and 1000 sheets thereof were heated for 2 hours in a closed stocker at a temperature of 60° C. and then subjected to gas chromatography analysis in the same manner as described above. As a result, while a little quantity of benzene was detected in the printed matters obtained using the inks of comparative examples (Nos. 38 and 39), the generation of benzene was not detected in the cases of printed matters obtained using the inks of the examples of this invention (Nos. 25-37) even in the interior of the stocker, thereby confirming the safety of these printed matters.

Further, the printed matters obtained using the inks of the examples of this invention were found minimal in printing error and hence, were very clear and accurate.

EXAMPLE III

First of all, a dispersion composition C5 (M) was prepared by following the same formulation as that of C1 (M) of Example I except that polyester resin having, as a terminal group, a cyclohexyl amine skeleton was employed as a dispersing agent. This cyclohexyl amine was pKb=3.34 and high in basicity.

Ink No. 40 was obtained by following the same formulation as that of the ink No. 4 except that the aforementioned dispersion composition C5 (M) was employed and the properties thereof were evaluated in the same manner as described above. The ink produced using the dispersing agent having a terminal group of strong basicity was confirmed to have excellent properties, i.e. the increase in size of pigment particles was reduced by half, i.e. about +12 nm and the frequency of printing error was also reduced to about 0.6 per hour.

As described above, it is possible, according to one aspect of the present invention, to provide an inkjet ink composition which is free from the discharge failure of ink and from the clogging of ink, thereby rendering the ink composition suitable for use as a UV-curing type inkjet ink for on-demand printing. According to another aspect of the present invention, it is possible to provide a printed matter which is excellent in quality of printed images and free from missing of printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inkjet ink composition comprising:
a pigment component having a resin comprising a basic terminal adsorbed thereto, the basic terminal having a basicity of not more than 4 pKb, the pigment component having an average particle diameter of 200 nm or less, the resin being selected from the group consisting of vinyl polymer or copolymer, acrylic polymer or copolymer, polyester, polyamide, polyimide, polyurethane, silicon-containing polymer, sulfur-containing polymer, fluorine-containing polymer and epoxy resin;
a photo-acid generating agent containing an onium salt selected from the group consisting of aryl sulfonium fluorophosphate and aryl iodonium fluorophosphates, each consisting of a monovalent salt and a multivalent salt; and
at least one kind of solvent which can be polymerized under the presence of an acid;
wherein the content of the multivalent salt included in the onium salt is not more than 20% by weight based on a total weight of onium salt; and
wherein the content of the pigment component is confined within the range of 3 to 41% by weight based on the ink composition.

2. The inkjet ink composition according to claim 1, wherein the onium salt has at least one benzene ring containing an organic group having 1 to 20 carbon atoms.

3. The inkjet ink composition according to claim 1, wherein the onium salt includes a compound represented by following general formula (1) or (2):

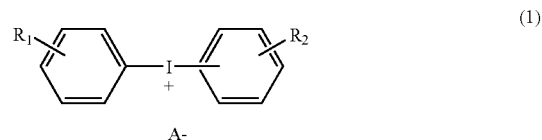

-continued

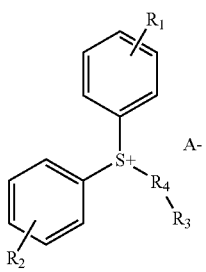

(2)

wherein A⁻ is a fluorophosphate anion; and $R_1$, $R_2$ and $R_3$ are the same or different and at least one is an organic group having 4 to 20 carbon atoms and the others are organic groups having 1 to 20 carbon atoms with at least one hydrogen atom; $R_4$ is a bivalent aromatic substituent group or a bivalent aromatic substituent group containing in its structure a sulfur or oxygen atom.

4. The inkjet ink composition according to claim 1, wherein the photo-acid generating agent is incorporated at an amount ranging from 2 to 4% by weight based on the entire weight of the solvent, and the inkjet ink further comprises a sensitizing agent.

5. The inkjet ink composition according to claim 1, wherein the photo-acid generating agent further comprises at least one selected from the group consisting of sulfonyl compounds, sulfonate compounds, sulfamide compounds and organic halide compounds.

6. The inkjet ink composition according to claim 1, wherein the pigment is a quinacridone pigment.

7. The inkjet ink composition according to claim 1, wherein the solvent which can be polymerized under the presence of an acid comprises at least one selected from the group consisting of limonene dioxide, neopentylglycol diglycidyl ether, bivalent oxetane compounds having an aliphatic group, and bivalent vinyl ether compounds having an alicyclic group.

8. The inkjet ink composition according to claim 1, wherein the compound to be incorporated as the solvent comprises an aliphatic group or an alicyclic group each containing therein an oxygen atom.

9. An inkjet ink composition comprising:
   a photo-acid generating agent;
   a pigment component having a resin including a basic terminal adsorbed thereon, the basic terminal having a basicity of not more than 4 pKb, the resin being selected from the group consisting of vinyl polymer or copolymer, acrylic polymer or copolymer, polyester, polyamide, polyimide, polyurethane, silicon-containing polymer, sulfur-containing polymer, fluorine-containing polymer and epoxy resin, the pigment component having an average particle diameter of 200 nm or less; and
   at least one kind of solvent which can be polymerized under the presence of an acid;
   wherein the photo-acid generating agent is a diaryl iodonium fluorophosphate comprising a benzene ring containing an organic group having 4 to 20 carbon atoms.

10. A printed matter comprising a cured substance of the inkjet ink composition as claimed in claim 1.

11. A printed matter comprising a cured substance of the inkjet ink composition as claimed in claim 9.

* * * * *

UNITED STATES PATENT AND TRADEMARK OFFICE
CERTIFICATE OF CORRECTION

PATENT NO. : 7,579,390 B2
APPLICATION NO. : 11/075183
DATED : August 25, 2009
INVENTOR(S) : Ushirogouchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Fourteenth Day of September, 2010

David J. Kappos
*Director of the United States Patent and Trademark Office*